(12) United States Patent
Matsumoto

(10) Patent No.: US 12,508,001 B2
(45) Date of Patent: Dec. 30, 2025

(54) ULTRASOUND SYSTEM AND CONTROL METHOD OF ULTRASOUND SYSTEM WHICH HAVE FUNCTION OF PREVENTING FORGETTING TO ATTACH PROTECTIVE EQUIPMENT THAT PROTECTS ULTRASOUND PROBE

(71) Applicant: FUJIFILM Corporation, Tokyo (JP)

(72) Inventor: Tsuyoshi Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 212 days.

(21) Appl. No.: 18/173,629

(22) Filed: Feb. 23, 2023

(65) Prior Publication Data

US 2023/0190238 A1 Jun. 22, 2023

Related U.S. Application Data

(63) Continuation of application No. PCT/JP2021/009021, filed on Mar. 8, 2021.

(30) Foreign Application Priority Data

Sep. 2, 2020 (JP) .................................. 2020-147414

(51) Int. Cl.
*A61B 8/00* (2006.01)

(52) U.S. Cl.
CPC .............. *A61B 8/5223* (2013.01); *A61B 8/54* (2013.01); *A61B 8/58* (2013.01); *G06T 2207/10132* (2013.01)

(58) Field of Classification Search
CPC ........... A61B 8/5223; A61B 8/54; A61B 8/58; G06T 2207/10132
See application file for complete search history.

(56) References Cited

U.S. PATENT DOCUMENTS 5,509,420 A 4/1996 Ohtomo et al.
6,370,480 B1 * 4/2002 Gupta .................... G01S 7/5205
702/39

(Continued)

FOREIGN PATENT DOCUMENTS

CN 109492522 A * 3/2019 ......... G06K 9/00369
JP H07-016225 A 1/1995

(Continued)

OTHER PUBLICATIONS

CN109492522A (Inst Automation Cas). Translated by Espacenet. Sep. 17, 2019. [retrieved Nov. 15, 2024]. (Year: 2018).*

(Continued)

*Primary Examiner* — Keith M Raymond
*Assistant Examiner* — Andrew W Begeman
(74) *Attorney, Agent, or Firm* — Studebaker Brackett PLLC

(57) ABSTRACT

In an ultrasound system and a control method of the ultrasound system, an ultrasound image generated from a reception signal obtained by performing transmission and reception of an ultrasound beam with respect to a subject using an ultrasound probe in a state where the ultrasound probe is separated from a body surface of the subject is acquired as an aerial radiation image; whether or not protective equipment is attached to the ultrasound probe is determined by analyzing the aerial radiation image; and a warning is issued to a user in a case where it is determined that the protective equipment is not attached to the ultrasound probe.

22 Claims, 11 Drawing Sheets

(56) References Cited

U.S. PATENT DOCUMENTS

| | | | |
|---|---|---|---|
| 2004/0231772 A1 | 11/2004 | Leonard et al. | |
| 2009/0281464 A1 | 11/2009 | Cioanta et al. | |
| 2010/0305450 A1* | 12/2010 | Kosaku | A61B 8/4281 |
| | | | 600/459 |
| 2011/0257521 A1 | 10/2011 | Fraden | |
| 2013/0338503 A1* | 12/2013 | Cohen | A61B 8/4411 |
| | | | 600/443 |
| 2014/0066779 A1* | 3/2014 | Nakanishi | A61B 8/4444 |
| | | | 600/459 |
| 2018/0140281 A1 | 5/2018 | Imai | |
| 2019/0107612 A1* | 4/2019 | Holl | G01S 15/8913 |
| 2020/0202527 A1* | 6/2020 | Choi | G06T 5/73 |
| 2020/0352518 A1* | 11/2020 | Lyman | A61B 6/5258 |

FOREIGN PATENT DOCUMENTS

| | | | |
|---|---|---|---|
| JP | 2006-506128 A | 2/2006 | |
| JP | 2011-072511 A | 4/2011 | |
| JP | 2011-528919 A | 12/2011 | |
| WO | 2017/033502 A1 | 3/2017 | |

OTHER PUBLICATIONS

International Search Report issued in PCT/JP2021/009021; mailed Apr. 27, 2021.

International Preliminary Report on Patentability (Chapter I) and Written Opinion of the International Searching Authority issued in PCT/JP2021/009021; issued Mar. 7, 2023.

* cited by examiner

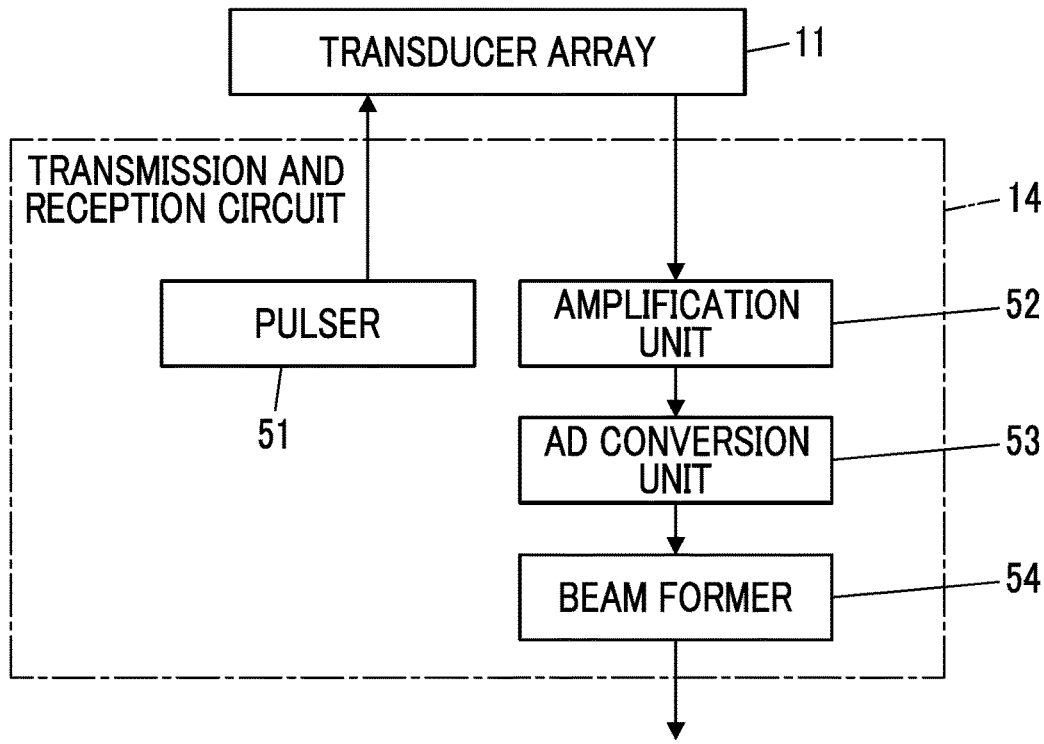
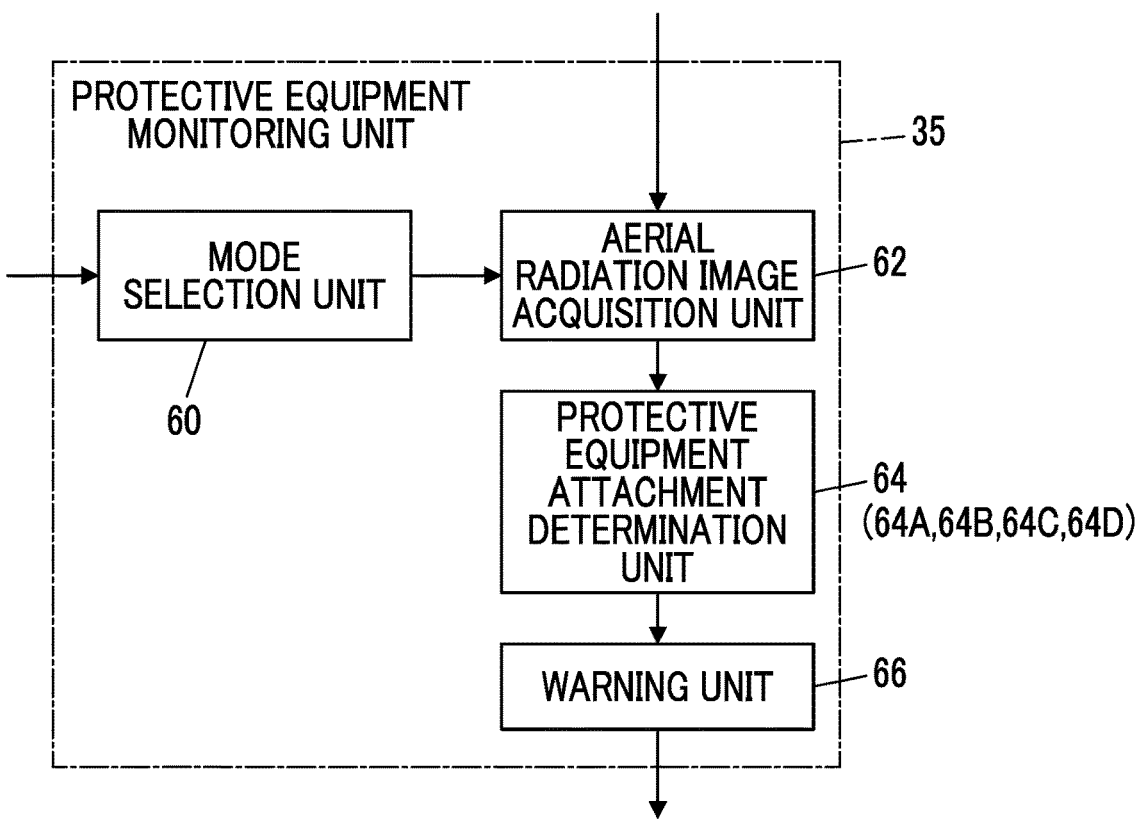

FIG. 16
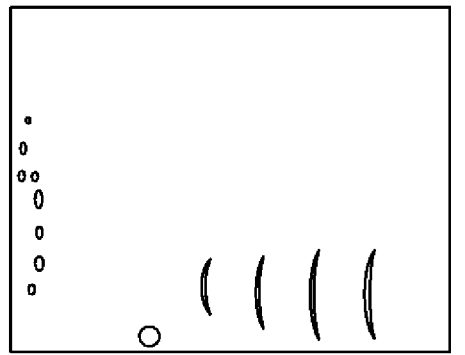
LINEAR TYPE
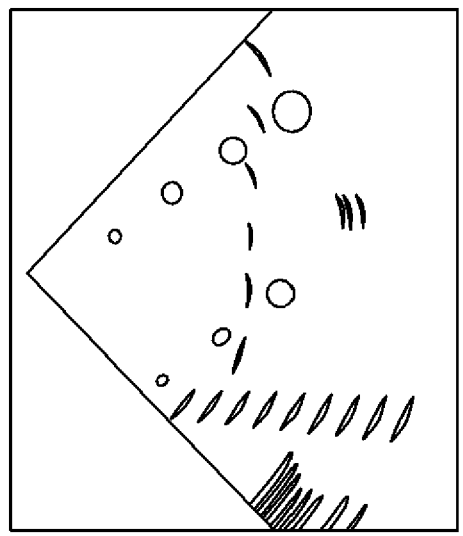
SECTOR TYPE
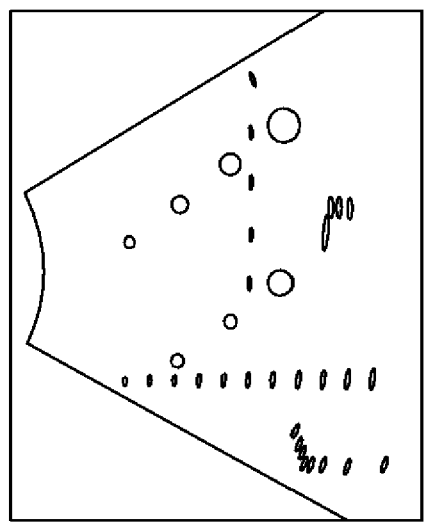
CONVEX TYPE

ULTRASOUND SYSTEM AND CONTROL METHOD OF ULTRASOUND SYSTEM WHICH HAVE FUNCTION OF PREVENTING FORGETTING TO ATTACH PROTECTIVE EQUIPMENT THAT PROTECTS ULTRASOUND PROBE

CROSS-REFERENCE TO RELATED APPLICATIONS

This application is a Continuation of PCT International Application No. PCT/JP2021/009021 filed on Mar. 8, 2021, which claims priority under 35 U.S.C. § 119(a) to Japanese Patent Application No. 2020-147414 filed on Sep. 2, 2020. The above applications are hereby expressly incorporated by reference, in its entirety, into the present application.

BACKGROUND OF THE INVENTION

1. Field of the Invention

The present invention relates to an ultrasound system and a control method of the ultrasound system which have a function of preventing forgetting to attach protective equipment that protects an ultrasound probe.

2. Description of the Related Art

In the related art, in a medical field, an ultrasound system using an ultrasound image has been put to practical use. In general, an ultrasound system comprises an ultrasound probe with a built-in transducer array, and an information terminal connected to the ultrasound probe, and the ultrasound system causes the ultrasound probe to transmit an ultrasound beam toward a subject, receives an ultrasound echo from the subject by the ultrasound probe, and electrically processes a reception signal thereof to generate an ultrasound image.

In a case where a pressure ulcer, edema that is a kind of phlebitis, and the like of the patient are diagnosed by the ultrasound system, after gel is applied to an ultrasonic wave transmission and reception surface of the ultrasound probe, food wraps, medical rubber gloves, covers, and the like are sometimes attached to the ultrasonic wave transmission and reception surface of the ultrasound probe as protective equipment in order to prevent the occurrence of infectious diseases. However, a nurse who is busy may forget to attach the protective equipment and bring the ultrasound probe into direct contact with the pressure ulcer and edema that is a kind of phlebitis of a patient. In this case, there is a risk of the occurrence of infectious diseases, and it takes time to clean the ultrasound probe after the diagnosis.

For example, there are JP2011-528919A, JP2006-506128A, and JP1995-016225A (JP-H07-016225A) as the documents in the related art that are references for the present invention.

JP2011-528919A discloses that a medical treatment device configured to provide ultrasound scanning is designed to be used in conjunction with an auxiliary treatment device that is sterile and can be single-use disposable, and is disposed proximate to a patient such that a first terminal of the medical treatment device is entirely or partially covered by the auxiliary treatment device to reduce the risk of secondary infection between patients using the medical treatment device.

JP2006-506128A discloses a medical equipment barrier device that uses a sensor to detect whether or not a cover portion, which covers the entire surface of the medical equipment in contact with the tissue and prevents viral or bacterial contagion, is arranged at a proper predetermined position of a probe head, and activates a probe so that the probe is available for an examination in a case where it is decided that the cover portion is arranged at the proper predetermined position of the probe head.

JP1995-016225A (JP-H07-016225A) discloses a biological tissue diagnostic apparatus in which a second measurement tank containing a subject is detachably provided in a first measurement tank containing at least one of a matching material or a tissue-equivalent material so as not to contaminate the matching material and the tissue-equivalent material, a physical quantity of the subject's tissue is measured by emitting at least one of ultrasonic waves or X-rays, attachment of the second measurement tank is detected, and the measured physical quantity of the subject's tissue is corrected on the basis of a correction value specific to the second measurement tank.

SUMMARY OF THE INVENTION

In JP2006-506128A and JP1995-016225A (JP-H07-016225A), since a physical sensor is used to detect protective equipment, the technique cannot be applied to a general ultrasound probe, and thus a dedicated ultrasound probe with low versatility is required. Further, since a dedicated ultrasound probe is used, there are also problems such as an increase in manufacturing costs and a risk of failure.

An object of the present invention is to provide an ultrasound system and a control method of the ultrasound system which do not require a dedicated ultrasound probe and can prevent forgetting to attach protective equipment in a general ultrasound probe.

In order to achieve the object, the present invention provides an ultrasound system comprising an ultrasound probe; an image generation unit that generates an ultrasound image from a reception signal obtained by performing transmission and reception of an ultrasound beam with respect to a subject using the ultrasound probe; an aerial radiation image acquisition unit that acquires the ultrasound image generated by the image generation unit in a state where the ultrasound probe is separated from a body surface of the subject, as an aerial radiation image; a protective equipment attachment determination unit that determines whether or not protective equipment is attached to the ultrasound probe by analyzing the aerial radiation image; and a warning unit that issues a warning to a user in a case where the protective equipment attachment determination unit determines that the protective equipment is not attached to the ultrasound probe.

Here, it is preferable that the protective equipment attachment determination unit determines whether or not the protective equipment is attached to the ultrasound probe by comparing the aerial radiation image with a representative aerial radiation image with protective equipment acquired using the ultrasound probe to which the protective equipment is attached and a representative aerial radiation image with no protective equipment acquired using the ultrasound probe to which the protective equipment is not attached.

Further, it is preferable that the protective equipment attachment determination unit updates a representative aerial radiation image with protective equipment acquired using the ultrasound probe to which the protective equipment is attached and a representative aerial radiation image with no protective equipment acquired using the ultrasound probe to which the protective equipment is not attached, by adding the latest representative aerial radiation image with protective equipment and the latest representative aerial radiation image with no protective equipment, and the protective equipment attachment determination unit determines whether or not the protective equipment is attached to the ultrasound probe by comparing the aerial radiation image with the updated representative aerial radiation image with protective equipment and the updated representative aerial radiation image with no protective equipment.

Further, it is preferable that the protective equipment attachment determination unit has a determination model that is trained using an aerial radiation image with protective equipment acquired using the ultrasound probe to which the protective equipment is attached and an aerial radiation image with no protective equipment acquired using the ultrasound probe to which the protective equipment is not attached, as teacher data, and the protective equipment attachment determination unit determines whether or not the protective equipment is attached to the ultrasound probe by the determination model on the basis of a new aerial radiation image acquired by the aerial radiation image acquisition unit.

It is preferable that the ultrasound system further comprises a server that has a determination model that is trained using an aerial radiation image with protective equipment acquired using the ultrasound probe to which the protective equipment is attached and an aerial radiation image with no protective equipment acquired using the ultrasound probe to which the protective equipment is not attached, as teacher data, and the protective equipment attachment determination unit transmits a new aerial radiation image acquired by the aerial radiation image acquisition unit to the server, and receives, from the server, a determination result of determining whether or not the protective equipment is attached to the ultrasound probe which is performed by the determination model on the basis of the new aerial radiation image received in the server.

It is preferable that the ultrasound system further comprises a database in which the aerial radiation images are distinguished and sequentially stored for each type of the ultrasound probe and for each case of presence and absence of the protective equipment.

Further, it is preferable that the determination model is trained using the aerial radiation images distinguished and stored in the database for each type of the ultrasound probe and for each case of the presence and absence of the protective equipment, as the teacher data, and determines whether or not the protective equipment is attached to the ultrasound probe according to the type of the ultrasound probe in use on the basis of the new aerial radiation image acquired by the aerial radiation image acquisition unit.

Further, it is preferable that the determination model is trained using the aerial radiation images distinguished and stored in the database for each type of the ultrasound probe, for each case of the presence and absence of the protective equipment, and for each case of presence and absence of gel, as the teacher data, and determines whether or not the protective equipment is attached to the ultrasound probe and whether or not the gel is applied to the ultrasound probe according to the type of the ultrasound probe in use on the basis of the new aerial radiation image acquired by the aerial radiation image acquisition unit.

It is preferable that the determination model is retrained by adding a predetermined number of the aerial radiation images stored in the database each time the predetermined number of the aerial radiation images are stored in the database.

It is preferable that the protective equipment attachment determination unit has a similarity degree evaluation unit that evaluates a similarity degree between the new aerial radiation image and the existing aerial radiation image stored in the database, and the determination model is retrained by adding the new aerial radiation image in a case where the similarity degree evaluated by the similarity degree evaluation unit is lower than a predetermined threshold value.

It is preferable that the determination model is retrained by adding the new aerial radiation image in a case where a determination result obtained by the determination model for the new aerial radiation image is incorrect.

It is preferable that the ultrasound system further comprises a mode selection unit that selects any one of a normal mode or a protective equipment mode, and in a case where the protective equipment mode is selected by the mode selection unit, the protective equipment attachment determination unit determines whether or not the protective equipment is attached to the ultrasound probe.

It is preferable that the ultrasound system further comprises a mode return unit that returns a mode from the protective equipment mode to the normal mode in a case where the protective equipment attachment determination unit determines that the protective equipment is attached to the ultrasound probe during driving in a sleep mode.

It is preferable that the aerial radiation image acquisition unit acquires the ultrasound image generated by the image generation unit, and determines whether or not the ultrasound probe is in contact with the body surface of the subject by analyzing the acquired ultrasound image, and the warning unit issues a warning to the user in a case where the aerial radiation image acquisition unit determines that the ultrasound probe is in contact with the body surface of the subject.

It is preferable that the aerial radiation image acquisition unit acquires a video as the aerial radiation image, and the protective equipment attachment determination unit determines that the protective equipment is attached to the ultrasound probe that has been determined not to be attached with the protective equipment, by a change of an image pattern in the video.

Further, the present invention provides a control method of an ultrasound system, and the control method includes acquiring an ultrasound image generated from a reception signal obtained by performing transmission and reception of an ultrasound beam with respect to a subject using an ultrasound probe in a state where the ultrasound probe is separated from a body surface of the subject, as an aerial radiation image; determining whether or not protective equipment is attached to the ultrasound probe by analyzing the aerial radiation image; and issuing a warning to a user in a case where it is determined that the protective equipment is not attached to the ultrasound probe.

According to the present invention, forgetting to attach the protective equipment is determined by analyzing the aerial radiation image to issue a warning to the user, and therefore, it is possible to prevent the user from forgetting to attach the protective equipment in a general ultrasound probe. Therefore, it is possible to reduce the risk of the occurrence of infectious diseases, and it is possible to save the trouble of cleaning the ultrasound probe after the diagnosis. Further, the present invention can be applied to a general ultrasound probe, and therefore, it is possible to suppress an increase in manufacturing cost and reduce the risk of failure.

BRIEF DESCRIPTION OF THE DRAWINGS

FIG. 3 is a block diagram illustrating a configuration of a transmission and reception circuit.

FIG. 4 is a block diagram illustrating a configuration of a protective equipment monitoring unit.

FIG. 16 is a conceptual diagram of an example illustrating aerial radiation images corresponding to types of ultrasound probes.

DESCRIPTION OF THE PREFERRED EMBODIMENTS

Hereinafter, an ultrasound system and a control method of the ultrasound system according to the present invention will be described in detail on the basis of preferred embodiments illustrated in the accompanying drawings.

Figure 1:
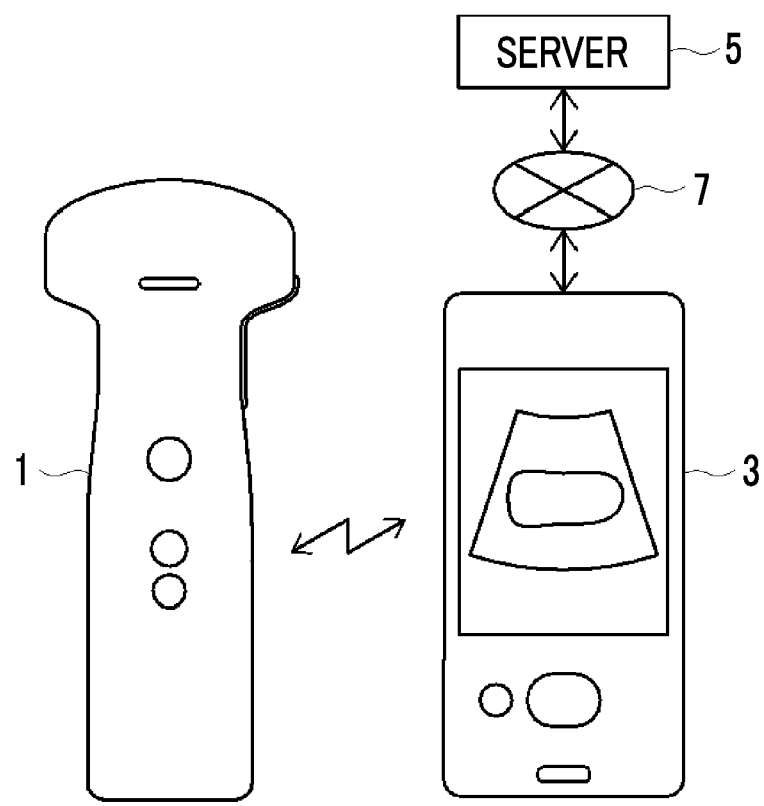
FIG. 1 is a conceptual diagram illustrating a configuration of an ultrasound system of an embodiment according to the present invention.

FIG. 1 is a conceptual diagram illustrating a configuration of an ultrasound system of an embodiment according to the present invention. The ultrasound system illustrated in FIG. 1 comprises an ultrasound probe 1, a handheld information terminal 3 connected to the ultrasound probe 1 in a wired or wireless manner, and a server 5. The ultrasound system of the present embodiment is realized by the ultrasound probe 1, the handheld information terminal 3, and an ultrasound diagnosis application program running on the information terminal 3.

Figure 2:
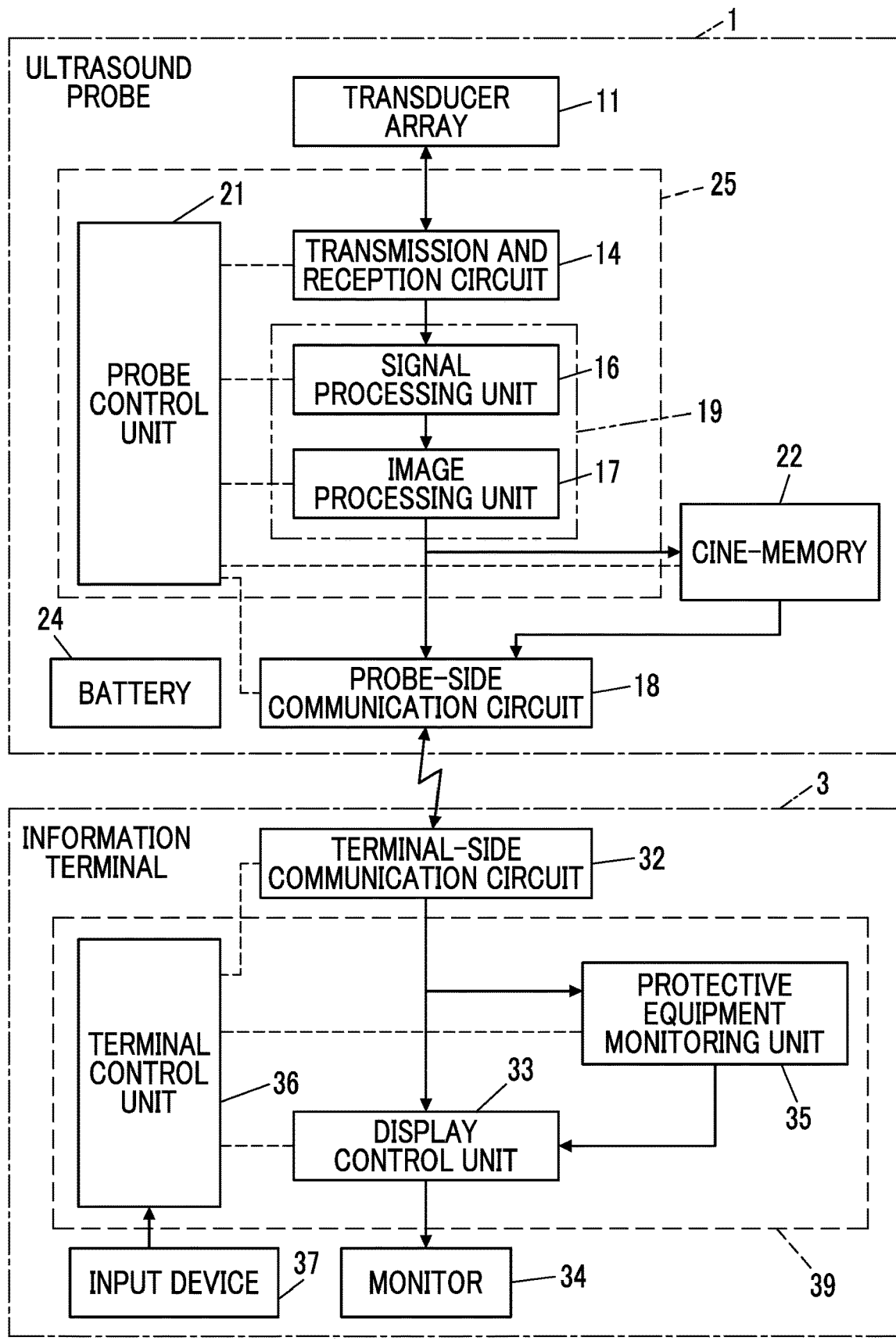
FIG. 2 is a block diagram illustrating configurations of an ultrasound probe and an information terminal.

The ultrasound probe 1 captures an ultrasound image by scanning a subject using ultrasound beams, and outputs data corresponding to the ultrasound image, that is, image information data of the ultrasound image in the case of the present embodiment. As illustrated in FIG. 2, the ultrasound probe 1 comprises a transducer array 11, a transmission and reception circuit 14, a signal processing unit 16, an image processing unit 17, a probe-side communication circuit 18, a probe control unit 21, a cine-memory 22, and a battery 24.

The transmission and reception circuit 14 is bidirectionally connected to the transducer array 11. The signal processing unit 16, the image processing unit 17, and the probe-side communication circuit 18 are sequentially connected in series to the transmission and reception circuit 14. The signal processing unit 16 and the image processing unit 17 constitute an image information data generation unit 19. Further, the cine-memory 22 is connected to the image processing unit 17, and the probe-side communication circuit 18 is connected to the cine-memory 22.

Further, the probe control unit 21 is connected to the transmission and reception circuit 14, the signal processing unit 16, the image processing unit 17, the cine-memory 22, and the probe-side communication circuit 18. The battery 24 is built in the ultrasound probe 1.

The transmission and reception circuit 14, the image information data generation unit 19 (the signal processing unit 16 and the image processing unit 17), and the probe control unit 21 constitute a probe-side processor 25.

The transducer array 11 has a plurality of ultrasonic transducers arranged in a one-dimensional or two-dimensional manner. According to a drive signal supplied from the transmission and reception circuit 14, each of the transducers transmits an ultrasonic wave and receives a reflected wave from the subject to output an analog reception signal.

For example, each transducer is formed by using an element in which electrodes are formed at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

The transmission and reception circuit 14 causes the transducer array 11 to transmit the ultrasonic wave, and performs reception focusing processing on the reception signal output from the transducer array 11 that has received the ultrasound echo to generate a sound ray signal, under the control of the probe control unit 21. As illustrated in FIG. 3, the transmission and reception circuit 14 has a pulser 51 connected to the transducer array 11, and an amplification unit 52, an analog digital (AD) conversion unit 53, and a beam former 54 that are sequentially connected in series from the transducer array 11.

The pulser 51 includes, for example, a plurality of pulse generators, and the pulser 51 adjusts the amount of delay of each drive signal so that ultrasonic waves transmitted from the plurality of transducers of the transducer array 11 form an ultrasound beam on the basis of a transmission delay pattern selected by the probe control unit 21, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and propagates toward the transducer array 11 of the ultrasound probe 1. Each transducer constituting the transducer array 11 expands and contracts by receiving the ultrasound echo propagating toward the transducer array 11 in this manner, to generate the reception signal that is an electric signal, and outputs the reception signal to the amplification unit 52.

The amplification unit 52 amplifies the signals input from each transducer constituting the transducer array 11, and transmits the amplified signals to the AD conversion unit 53. The AD conversion unit 53 converts the signal transmitted from the amplification unit 52 into digital reception data, and outputs the reception data to the beam former 54.

The beam former 54 performs so-called reception focusing processing in which addition is performed by giving delays to respective pieces of the reception data converted by the AD conversion unit 53 according to a sound speed distribution or a sound speed set on the basis of a reception delay pattern selected by the probe control unit 21. Through the reception focusing processing, a sound ray signal in which each piece of the reception data converted by the AD conversion unit 53 is phased and added and the focus of the ultrasound echo is narrowed is generated.

The image information data generation unit 19 generates image information data on the basis of the sound ray signal generated by the transmission and reception circuit 14. The image information data generation unit 19 has the signal processing unit 16 and the image processing unit 17 as described above.

The signal processing unit 16 generates image signal data before imaging into the ultrasound image, on the basis of the sound ray signal generated by the transmission and reception circuit 14, under the control of the probe control unit 21. More specifically, the signal processing unit 16 generates, as the image signal data before imaging, a signal representing tomographic image information regarding tissues inside the subject, by performing envelope detection processing after signal processing, for example, correcting the attenuation of the sound ray signal generated by the beam former 54 of the transmission and reception circuit 14, which is caused by the propagation distance according to the depth of the reflection position of the ultrasonic wave.

The image processing unit 17 generates the ultrasound image as the image information data generated by the image information data generation unit 19 on the basis of the image signal data generated by the signal processing unit 16, under the control of the probe control unit 21. More specifically, the image processing unit 17 raster-converts the image signal data before imaging, which is generated by the signal processing unit 16 into the image signal according to a normal television signal scanning method, performs various kinds of image processing such as brightness correction, gradation correction, sharpness correction, image size correction, refresh rate correction, scanning frequency correction, and color correction according to a display format of a monitor 34, on the image signal converted in this manner to generate the ultrasound image (ultrasound image signal), and then outputs the generated ultrasound image as the image information data to the probe-side communication circuit 18.

The transmission and reception circuit 14, the signal processing unit 16, and the image processing unit 17 constitute an image generation unit of the present invention.

The image generation unit generates an ultrasound image from the reception signal obtained by performing transmission and reception of the ultrasound beams with respect to the subject using the ultrasound probe 1 (more precisely, transducer array 11), that is, an ultrasound image of the image information data in the case of the present embodiment.

The cine-memory 22 stores the image information data generated by the image information data generation unit 19, under the control of the probe control unit 21. More specifically, the cine-memory 22 stores the ultrasound image generated by the image processing unit 17 of the image information data generation unit 19, as the image information data in a case of a live mode. The cine-memory 22 has a memory capacity for storing ultrasound images of several tens to several hundreds of frames in a case where ultrasound images for several seconds to several tens of seconds, for example, ultrasound images of 30 frames for one second are captured.

The cine-memory 22 is a ring buffer. Thus, in a case where the ultrasound images of past frames for the number of frames corresponding to the memory capacity are stored in the cine-memory 22, instead of the ultrasound image of the oldest frame, the ultrasound image of the latest frame is sequentially stored in the cine-memory 22. In this manner, the ultrasound images of the past frames for the number of frames corresponding to the memory capacity, from the ultrasound image of the latest frame are always stored in the cine-memory 22.

Here, the live mode is a mode in which the ultrasound images (video) captured at a certain frame rate are sequentially displayed (real time display).

A freeze mode is a mode in which the ultrasound images (video) captured in the case of the live mode are stored in the cine-memory 22 and the ultrasound images (static image) of any frames are read out and displayed from the ultrasound images (video) of the past frames stored in the cine-memory 22.

The probe-side communication circuit 18 transmits the image information data generated by the image processing unit 17 or the image information data stored in the cine-memory 22 in a wired or wireless manner under the control of the probe control unit 21.

In the present embodiment, the probe-side communication circuit 18 includes an antenna for transmitting and receiving radio waves, modulates a carrier on the basis of the ultrasound image generated by the image processing unit 17 to generate a transmission signal, and transmits radio waves from the antenna by supplying the transmission signal to the antenna to perform wireless transmission of the ultrasound image.

As the modulation method of the carrier, amplitude shift keying (ASK), phase shift keying (PSK), quadrature phase shift keying (QPSK), 16 quadrature amplitude modulation (16QAM), or the like is used.

Further, the probe-side communication circuit 18 can also connect the ultrasound probe 1 and the information terminal 3 in a wired manner using a cable such as a Universal Serial Bus (USB) cable.

The probe-side communication circuit 18 wirelessly transmits the image information data of the frame generated by the image information data generation unit 19 in the case of the live mode, and wirelessly transmits the image information data stored in the cine-memory 22 in the case of the freeze mode.

The probe control unit 21 controls each unit of the ultrasound probe 1 on the basis of a program and the like stored in advance. More specifically, the probe control unit 21 controls the transmission and reception circuit 14 such that transmission of ultrasound beams and reception of ultrasound echoes are performed on the basis of an examination mode and a scanning method set in advance. The probe control unit 21 controls the signal processing unit 16 and the image processing unit 17 of the image information data generation unit 19 such that signal processing set in advance is performed on the sound ray signal and the image processing set in advance is performed on the image signal data. The probe control unit 21 performs control such that the image information data generated by the image information data generation unit 19 is stored in the cine-memory 22 in the case of the live mode, and the ultrasound image of the past frame stored in the cine-memory 22 is read out in the case of the freeze mode. Further, the probe control unit 21 controls the probe-side communication circuit 18 such that the image signal data is transmitted with a transmission radio field intensity set in advance.

Here, the examination mode indicates any of examination modes that can be used in the ultrasound system, such as a brightness (B) mode, a color Doppler (CF) mode, a power Doppler (PD) mode, a motion (M) mode, a pulse wave Doppler (PW) mode, and a continuous wave Doppler (CW) mode, and the scanning method indicates any one of scanning methods such as an electronic sector scanning method, an electronic linear scanning method, and an electronic convex scanning method.

The battery 24 is built in the ultrasound probe 1, and supplies power to each circuit of the ultrasound probe 1.

Next, the information terminal 3 is a handheld terminal device such as a smartphone and a tablet personal computer (PC), and displays the ultrasound image on the basis of data corresponding to the ultrasound image captured by the ultrasound probe 1. As illustrated in FIG. 2, the information terminal 3 comprises a terminal-side communication circuit 32, a display control unit 33, a protective equipment monitoring unit 35, a terminal control unit 36, the monitor (display unit) 34, and an input device 37.

The display control unit 33 and the monitor 34 are sequentially connected in series to the terminal-side communication circuit 32. The protective equipment monitoring unit 35 is connected to the terminal-side communication circuit 32, and the display control unit 33 is connected to the protective equipment monitoring unit 35. The terminal control unit 36 is connected to the terminal-side communication circuit 32, the display control unit 33, and the protective equipment monitoring unit 35, and the input device 37 is connected to the terminal control unit 36.

In the present embodiment, the probe-side communication circuit 18 of the ultrasound probe 1 and the terminal-side communication circuit 32 of the information terminal 3 are connected in a wireless manner by wireless communication, and the ultrasound probe 1 and the information terminal 3 are connected so that the information can be bidirectionally delivered.

The terminal-side communication circuit 32 receives the image information data transmitted from the probe-side communication circuit 18 of the ultrasound probe 1 in a wired or wireless manner, under the control of the terminal control unit 36. In the present embodiment, the terminal-side communication circuit 32 includes an antenna for transmitting and receiving radio waves, receives a transmission signal wirelessly transmitted from the probe-side communication circuit 18 via the antenna, demodulates the received transmission signal, and outputs the ultrasound image (ultrasound image signal) as the image information data.

The display control unit 33 displays various kinds of information on the monitor 34 under the control of the terminal control unit 36. The display control unit 33 displays the ultrasound image on the monitor 34 on the basis of the image information data received by the terminal-side communication circuit 32, for example. More specifically, the display control unit 33 performs predetermined processing on the ultrasound image as the image information data to display the processed ultrasound image on the monitor 34. Further, the display control unit 33 displays a warning message or the like issued from the protective equipment monitoring unit 35 on the monitor 34.

As illustrated in FIG. 4, the protective equipment monitoring unit 35 comprises a mode selection unit 60, an aerial radiation image acquisition unit 62, a protective equipment attachment determination unit 64, and a warning unit 66. The aerial radiation image acquisition unit 62 is connected to the mode selection unit 60. The protective equipment attachment determination unit 64 and the warning unit 66 are sequentially connected in series to the aerial radiation image acquisition unit 62.

The mode selection unit 60 selects any one of a normal mode and a protective equipment mode, as an operation mode according to an instruction from the user input via the input device 37, for example. The mode selection unit 60 holds a selection state of the operation mode.

The protective equipment mode is an operation mode in which whether or not the protective equipment is attached to the ultrasound probe 1, that is, the presence or absence of the protective equipment is monitored. On the other hand, the normal mode is an operation mode in which the ultrasound image is captured as usual without monitoring of the presence or absence of the protective equipment.

By providing the mode selection unit 60, it is possible for the user to freely select whether to monitor the presence or absence of the protective equipment.

The mode selection unit 60 is not particularly limited as long as the unit can switch between the normal mode and the protective equipment mode, and may be various switches such as a DIP switch, or a user interface (UI) or the like displayed on a touch panel as the monitor 34 and the input device 37. In this case, the mode selection unit 60 switches between the normal mode and the protective equipment mode according to the turning on or off of the switch or a touch operation from the UI, by the user.

The mode selection unit 60 may identify the user registered in advance, for example, by biometric authentication or the like, and automatically switch between the normal mode and the protective equipment mode for each user. In this case, the mode selection unit 60 may select an education mode (beginner's mode) as the operation mode. The education mode is an operation mode in which the presence or absence of the protective equipment is monitored as in the protective equipment mode, but is used for the purpose of educating the nurse or the like. The education mode is not particularly limited, and has, in addition to the same operation as the protective equipment mode, a function for the purpose of education, for example, issuing to the user a message prompting the user to check the presence or absence of the protective equipment regardless of the presence or absence of the protective equipment, issuing to the user a message indicating the attachment state of the past protective equipment, and warning the user about forgetting to attach the protective equipment, and a function of automatically switching from the education mode to the normal mode in a case where the number of times the user attaches the protective equipment exceeds a predetermined threshold value.

Note that providing the mode selection unit 60 is not necessary. A configuration may be adopted in which the presence or absence of the protective equipment is always determined without providing the mode selection unit 60.

The aerial radiation image acquisition unit 62 acquires the ultrasound image that is generated by the image generation unit in a state where the ultrasound probe 1 is separated from the body surface of the subject, as the aerial radiation image.

The aerial radiation image acquisition unit 62 can acquire the aerial radiation image at a timing such as after the ultrasound system is turned on and the protective equipment mode is selected and before the ultrasound probe 1 is brought into contact with the body surface of the subject, for example. Further, the aerial radiation image acquisition unit 62 may acquire one ultrasound image (static image) as the aerial radiation image, may continuously acquire two or more ultrasound images (static images) as the aerial radiation image, or may acquire a video as the aerial radiation image.

The protective equipment attachment determination unit 64 determines whether or not the protective equipment is attached to the ultrasound probe 1 by analyzing (image analysis) the aerial radiation image acquired by the aerial radiation image acquisition unit 62 by using pattern recognition or the like.

The warning unit 66 issues a warning to the user in a case where the protective equipment attachment determination unit 64 determines that the protective equipment is not attached to the ultrasound probe 1. In a case where gel is not applied to the ultrasound probe 1, and in a case where the ultrasound probe 1 is in contact with the body surface of the subject at the time of acquiring the aerial radiation image by the aerial radiation image acquisition unit 62, the warning unit 66 may issue a warning to the user.

The warning is not particularly limited as long as the warning prompts the user to check the presence or absence of the protective equipment. As the warning, a message may be displayed on the monitor 34, a message may be read aloud and output from a speaker, or both the methods may be performed at the same time.

The aerial radiation image acquisition unit 62, the protective equipment attachment determination unit 64, and the warning unit 66 are operated only in a case where the protective equipment mode is selected by the mode selection unit 60, and are not operated in the case of the normal mode. That is, in a case where the protective equipment mode is selected by the mode selection unit 60, the aerial radiation image acquisition unit 62 acquires the aerial radiation image, the protective equipment attachment determination unit 64 determines the presence or absence of the protective equipment, and the warning unit 66 issues a warning in a case where there is no protective equipment.

The terminal control unit 36 controls each unit of the information terminal 3 on the basis of a program stored in advance and an instruction or the like of the user input from the input device 37. More specifically, the terminal control unit 36 controls the terminal-side communication circuit 32 such that the reception of the transmission signal from the probe-side communication circuit 18 of the ultrasound probe 1 is performed. Further, the terminal control unit 36 controls the display control unit 33 such that the ultrasound image is displayed on the monitor 34 on the basis of the image information data. The terminal control unit 36 controls the protective equipment monitoring unit 35 to monitor the presence or absence of the protective equipment.

The display control unit 33, the protective equipment monitoring unit 35, and the terminal control unit 36 constitute a terminal-side processor 39.

The monitor 34 displays various kinds of information. The monitor 34 displays, for example, the information on the type of the error, the operation information, and the ultrasound image generated by the display control unit 33. Examples of the monitor 34 include a display device such as a liquid crystal display (LCD), and an organic electroluminescence (EL) display.

The input device 37 is for the user to perform an input operation to input various instructions, and includes a touch panel and the like by which the user can perform a touch operation to input various instructions, in the present embodiment.

Figure 5:
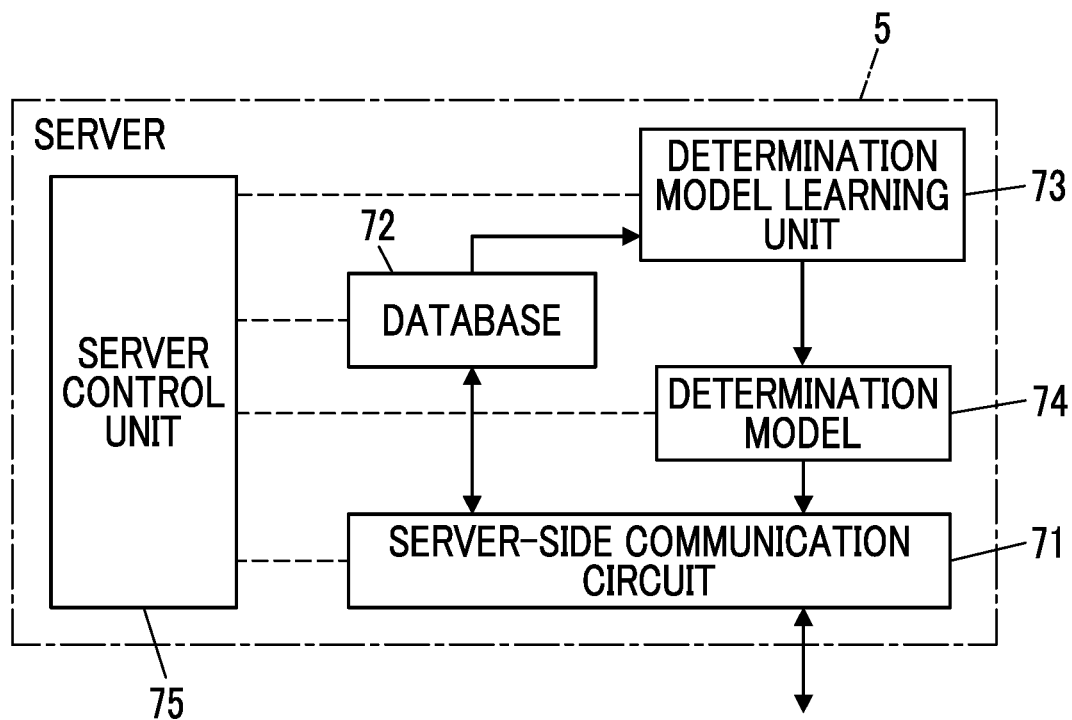
FIG. 5 is a block diagram illustrating a configuration of a server.

The server 5 is for determining the presence or absence of the protective equipment by the trained model, and comprises a server-side communication circuit 71, a database 72, a determination model learning unit 73, a determination model 74, and a server control unit 75, as illustrated in FIG. 5.

The determination model 74 and the server-side communication circuit 71 are sequentially connected in series to the determination model learning unit 73. The database 72 is bidirectionally connected to the server-side communication circuit 71, and the determination model learning unit 73 is connected to the database 72. The server control unit 75 is connected to the server-side communication circuit 71, the database 72, the determination model learning unit 73, and the determination model 74.

The server-side communication circuit 71 of the server 5 and the terminal-side communication circuit 32 of the information terminal 3 are connected via a communication line (network) 7 such as wireless fidelity (Wi-Fi), the Internet, and a telephone line, and thus the server 5 and the information terminal 3 are connected such that the information can be bidirectionally delivered.

The server-side communication circuit 71 receives various kinds of information transmitted from the terminal-side communication circuit 32 of the information terminal 3, under the control of the server control unit 75. In the present embodiment, the server-side communication circuit 71 sequentially receives new aerial radiation images and the like transmitted from the information terminals 3 of a plurality of ultrasound systems, and transmits the latest aerial radiation image with protective equipment and the latest aerial radiation image with no protective equipment read out from the database 72, or the determination result or the like by the determination model 74 to the information terminal 3.

The database 72 sequentially stores new aerial radiation images received by the server-side communication circuit 71. In the present embodiment, the database 72 sequentially stores, as new aerial radiation images, the aerial radiation image with protective equipment acquired by using the ultrasound probe 1 to which the protective equipment is attached, and the aerial radiation image with no protective equipment acquired by using the ultrasound probe 1 to which the protective equipment is not attached. Accordingly, the latest aerial radiation image with protective equipment and the latest aerial radiation image with no protective equipment are always stored in the database 72.

The determination model learning unit 73 creates the determination model (trained model) 74 in which the relationship between the aerial radiation image and the presence or absence of the protective equipment is trained for a plurality of pieces of teacher data, by using the aerial radiation image with protective equipment and the aerial radiation image with no protective equipment stored in the database 72 as the teacher data. The determination model learning unit 73 gradually optimizes the determination model 74 by repeating the training (re-training) of the relationship between the aerial radiation image and the presence or absence of the protective equipment with a new aerial radiation image stored in the database 72 as an input.

The server control unit 75 controls each unit of the server 5 on the basis of a program and the like stored in advance. More specifically, the server control unit 75 controls the server-side communication circuit 71 such that the reception of data from the terminal-side communication circuit 32 is performed. The server control unit 75 controls the database 72 such that a new aerial radiation image received by the server-side communication circuit 71 is stored. The server control unit 75 controls the determination model learning unit 73 such that the determination model 74 is created and optimized.

Note that the ultrasound system does not necessarily include the server 5.

Next, the method of determining the presence or absence of the protective equipment by the protective equipment attachment determination unit 64 will be described.

A protective equipment attachment determination unit 64A of a first example determines the presence or absence of the protective equipment by comparing the aerial radiation image with a representative aerial radiation image with protective equipment and a representative aerial radiation image with no protective equipment.

Here, specific examples of the representative aerial radiation image with protective equipment and the representative aerial radiation image with no protective equipment will be described.

Figure 6:
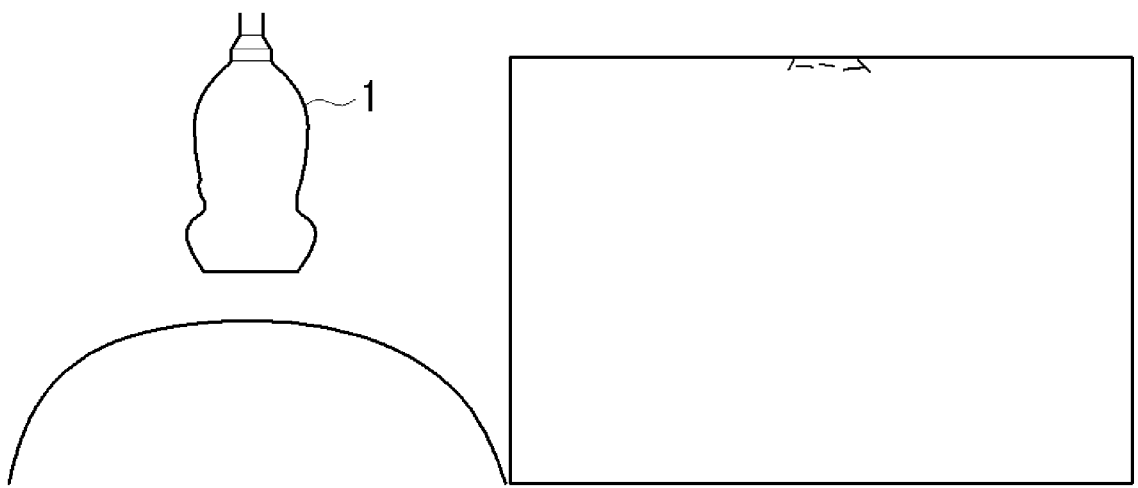
FIG. 6 is a conceptual diagram of an example illustrating an aerial radiation image with no gel, no protective equipment, and no contact.
Figure 7:
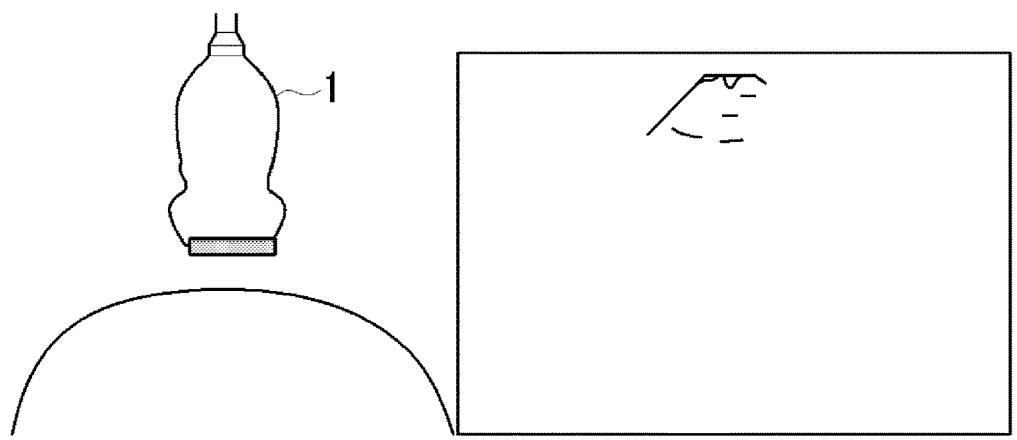
FIG. 7 is a conceptual diagram of an example illustrating an aerial radiation image with gel, no protective equipment, and no contact.

FIGS. 6 and 7 are representative aerial radiation images with no protective equipment with no contact with the body surface of the subject, FIG. 6 is an aerial radiation image with no gel and no protective equipment, and FIG. 7 is an aerial radiation image with gel and no protective equipment. The representative aerial radiation image with no protective equipment with no contact includes a high brightness (bright) portion only within a certain range from the upper portion of the image, that is, from the ultrasound probe 1 side at the time of acquiring the aerial radiation image regardless of whether or not gel is applied to the ultrasound probe 1, that is, the presence or absence of gel, but is an image with low brightness (dark) over almost the entire surface.

Figure 8:
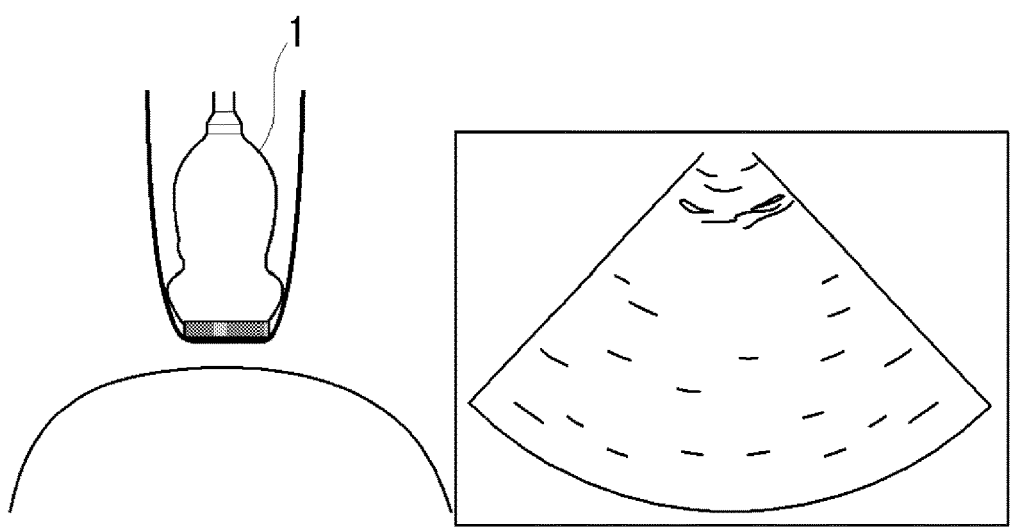
FIG. 8 is a conceptual diagram of an example illustrating an aerial radiation image with gel, protective equipment, and no contact.

FIG. 8 is a representative aerial radiation image with protective equipment with no contact with the body surface of the subject, and is an aerial radiation image with gel and protective equipment. The representative aerial radiation image with protective equipment with no contact is bright over the entire image region of the aerial radiation image as in a random noise image, due to the influence of multiple reflections by the gel and protective equipment.

Figure 9:
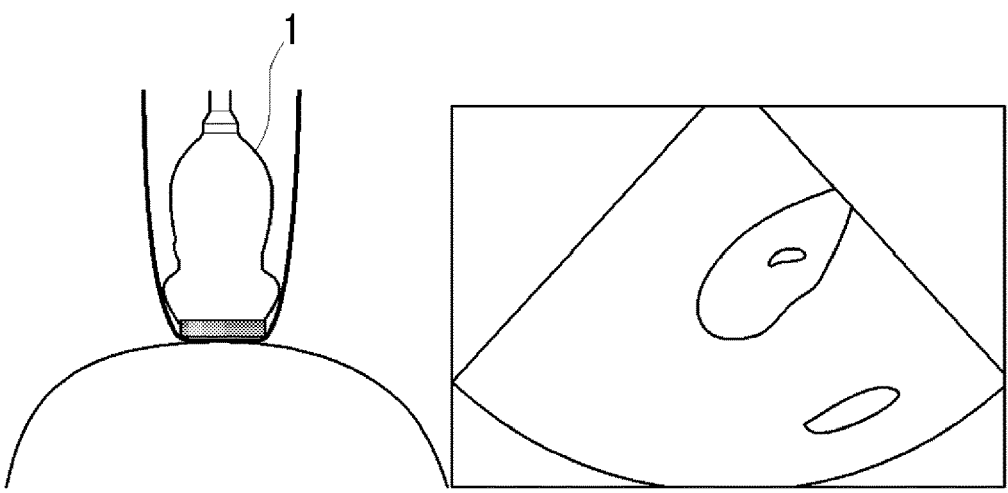
FIG. 9 is a conceptual diagram of an example illustrating an ultrasound image with gel, protective equipment, and contact.
Figure 10:
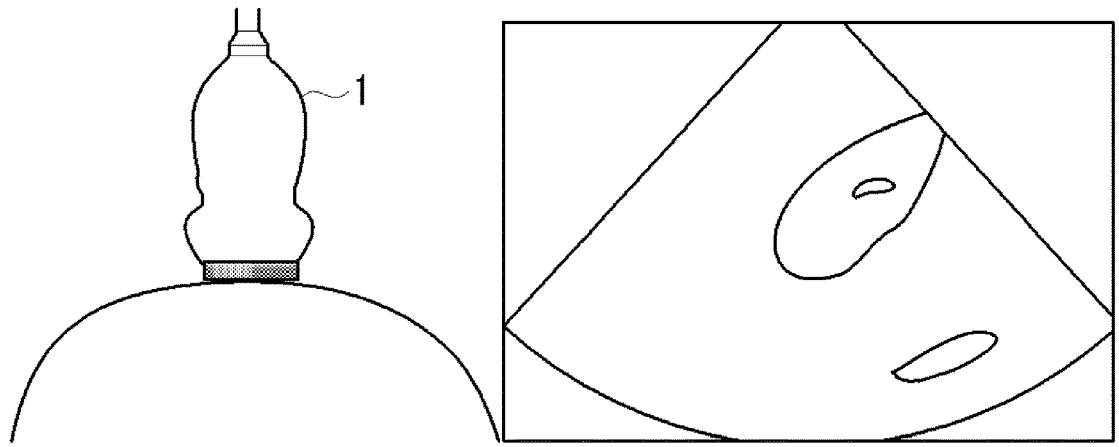
FIG. 10 is a conceptual diagram of an example illustrating an ultrasound image with gel, no protective equipment, and contact.

FIGS. 9 and 10 are representative aerial radiation images with protective equipment with contact with the body surface of the subject, FIG. 9 is an ultrasound image with gel and protective equipment, and FIG. 10 is an ultrasound image with gel and no protective equipment. In the representative aerial radiation image with protective equipment with contact, organs and the like are present in the image region of the ultrasound image regardless of the presence or absence of the protective equipment, as in a normal ultrasound image.

As described above, depending on the presence or absence of the protective equipment, the presence or absence of the gel, and whether or not the ultrasound probe 1 is in contact with the body surface of the subject, that is, the presence or absence of the contact, the aerial radiation images (ultrasound images) have a distinct difference in image patterns. Accordingly, the protective equipment attachment determination unit 64A can determine the presence or absence of the protective equipment, the presence or absence of the gel, and the presence or absence of the contact by analyzing the representative aerial radiation image with protective equipment and the representative aerial radiation image with no protective equipment by using the pattern recognition, the organ detection, and the like.

In a case where the aerial radiation image is a static image, the protective equipment attachment determination unit 64A can determine the presence or absence of the protective equipment using the difference in the image pattern in the static image. Further, the presence or absence of the gel and the presence or absence of the contact can be determined.

In a case where the aerial radiation image is a video, the protective equipment attachment determination unit 64A can determine that the protective equipment is attached to the ultrasound probe 1 that has been determined not to be attached with the protective equipment, by the change of the image pattern in the video. For example, in the video, it can be seen that a state with no protective equipment is changed to a state with protective equipment by the change of the image pattern from the image pattern with no protective equipment illustrated in FIGS. 6 and 7 to the state with protective equipment illustrated in FIG. 8.

Figure 11:
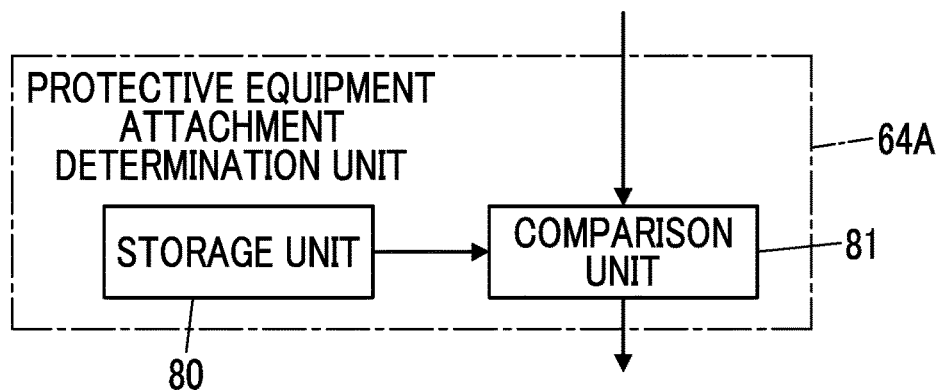
FIG. 11 is a block diagram illustrating a configuration of a protective equipment attachment determination unit of a first example.

The protective equipment attachment determination unit 64A of the first example comprises a storage unit 80 and a comparison unit 81 as illustrated in FIG. 11. The comparison unit 81 is connected to the storage unit 80.

In the protective equipment attachment determination unit 64A of the first example, the aerial radiation image acquired by the aerial radiation image acquisition unit 62 is compared with the representative aerial radiation image with protective equipment and the representative aerial radiation image with no protective equipment stored in the storage unit 80, by the comparison unit 81. Then, as a result of the comparison, it is determined whether or not the protective equipment is attached to the ultrasound probe 1. That is, it is determined that there is protective equipment in a case where the aerial radiation image matches the representative aerial radiation image with protective equipment, and it is determined that there is no protective equipment in a case where the aerial radiation image matches the representative aerial radiation image with no protective equipment.

The brightness state in the aerial radiation image varies depending on the type of the ultrasound probe 1, the type of the protective equipment, the degree of application of the gel, and the like. Accordingly, it is preferable to decide the representative aerial radiation image with protective equipment and the representative aerial radiation image with no protective equipment from a plurality of aerial radiation images depending on the type of the ultrasound probe 1, the type of the protective equipment, the degree of application of the gel, and the like that are to be actually used in the diagnosis.

A protective equipment attachment determination unit 64B of a second example determines the presence or absence of the protective equipment by comparing the aerial radiation image with an updated representative aerial radiation image with protective equipment and an updated representative aerial radiation image with no protective equipment.

Figure 12:
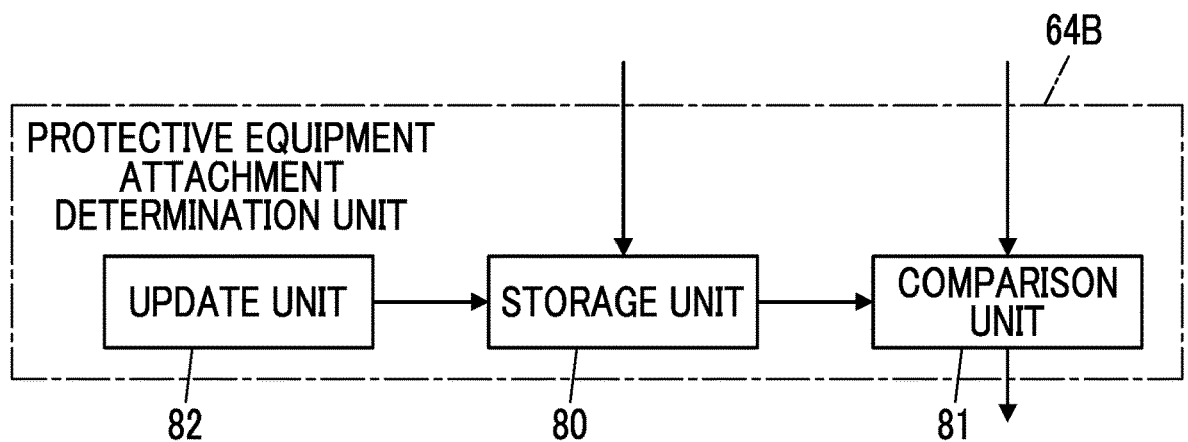
FIG. 12 is a block diagram illustrating a configuration of a protective equipment attachment determination unit of a second example.

The protective equipment attachment determination unit 64B of the second example comprises an update unit 82 in addition to the storage unit 80 and the comparison unit 81 of the first example, as illustrated in FIG. 12. The storage unit 80 and the comparison unit 81 are serially connected in series to the update unit 82. Further, the protective equipment attachment determination unit 64B of the second example includes the database 72 in the server 5 as illustrated in FIG. 5.

As described above, the latest aerial radiation image with protective equipment and the latest aerial radiation image with no protective equipment are always and sequentially stored in the database 72.

In the protective equipment attachment determination unit 64B of the second example, by the update unit 82, the latest aerial radiation image with protective equipment and the latest aerial radiation image with no protective equipment transmitted from the server 5 are received via the terminal-side communication circuit 32, and are stored in the storage unit 80. In this manner, the representative aerial radiation image with protective equipment and the representative aerial radiation image with no protective equipment that have been stored in the storage unit 80 are updated by adding the latest representative aerial radiation image with protective equipment and the latest representative aerial radiation image with no protective equipment.

The subsequent operations are the same as those in the first example, except that the representative aerial radiation image with protective equipment and the representative aerial radiation image with no protective equipment are the updated representative aerial radiation image with protective equipment and the updated representative aerial radiation image with no protective equipment.

The user may use a new type of protective equipment that has not been used before as the protective equipment. In addition, the state of the aerial radiation image is changed depending on the type of the ultrasound probe 1, the degree of application of the gel, and the like.

Accordingly, in a case where the representative aerial radiation image with protective equipment and the representative aerial radiation image with no protective equipment are not updated as in the first example, it may not be possible to determine the presence or absence of a new type of protective equipment. On the other hand, by updating the representative aerial radiation image with protective equipment and the representative aerial radiation image with no protective equipment by adding the latest representative aerial radiation image with protective equipment and the latest representative aerial radiation image with no protective equipment as in the second example, it is possible to determine the presence or absence of a new type of protective equipment.

The update timing by the update unit 82 is not particularly limited, but may be a case where the ultrasound system is turned on, a case where the ultrasound probe 1 is connected to the information terminal 3, a case where the protective equipment mode is selected by the mode selection unit 60, or the like.

A protective equipment attachment determination unit 64C of the third example determines the presence or absence of the protective equipment by the determination model of the information terminal 3.

Figure 13:
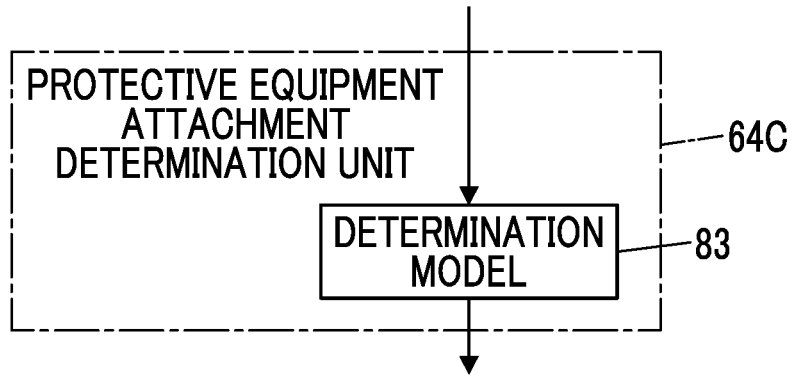
FIG. 13 is a block diagram illustrating a configuration of a protective equipment attachment determination unit of a third example.

The protective equipment attachment determination unit 64C of the third example comprises a determination model 83, which is same as the determination model 74 of the server 5, in the information terminal 3 as illustrated in FIG. 13.

In the protective equipment attachment determination unit 64C of the third example, whether or not the protective equipment is attached to the ultrasound probe 1 is determined by the determination model 83 of the information terminal 3 on the basis of the new aerial radiation image acquired by the aerial radiation image acquisition unit 62. More specifically, the determination model of the information terminal 3 uses the new aerial radiation image acquired by the aerial radiation image acquisition unit 62 as an input, and outputs a prediction result of the presence or absence of the protective equipment on the basis of the training result.

A protective equipment attachment determination unit 64D of the fourth example determines the presence or absence of the protective equipment by the determination model 74 of the server 5.

Figure 14:
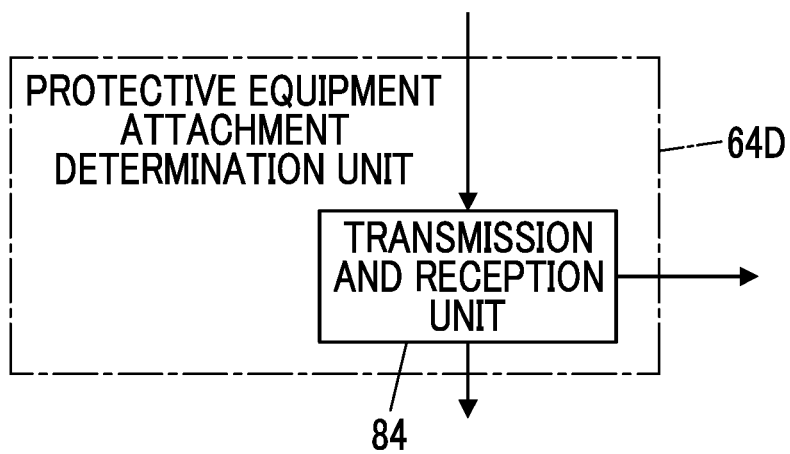
FIG. 14 is a block diagram illustrating a configuration of a protective equipment attachment determination unit of a fourth example.

The protective equipment attachment determination unit 64D of the fourth example comprises a transmission and reception unit 84 in the information terminal 3 as illustrated in FIG. 14. Further, the protective equipment attachment determination unit 64D of the fourth example includes the determination model 74 in the server as illustrated in FIG. 5.

In the protective equipment attachment determination unit 64D of the fourth example, the new aerial radiation image acquired by the aerial radiation image acquisition unit 62 is transmitted by the transmission and reception unit 84 from the information terminal 3 to the server 5 via the terminal-side communication circuit 32.

Next, whether or not the protective equipment is attached to the ultrasound probe 1 is determined by the determination model 74 of the server 5 on the basis of the new aerial radiation image received in the server 5.

The determination result of the presence or absence of the protective equipment is transmitted from the server 5 to the information terminal 3, and is received by the transmission and reception unit 84 via the terminal-side communication circuit 32 of the information terminal 3.

As described above, the determination model 74 is gradually optimized by the determination model learning unit 73 repeating the training using new aerial radiation images with protective equipment and new aerial radiation images with no protective equipment transmitted from the information terminal 3, as the teacher data. Accordingly, as in the third example and the fourth example, by determining the presence or absence of the protective equipment using the determination model 74, it is possible to sequentially apply to a new type of protective equipment, and it is possible to determine the presence or absence of the protective equipment.

Next, the method of training the determination model 74 by the determination model learning unit 73 will be described.

Figure 15:
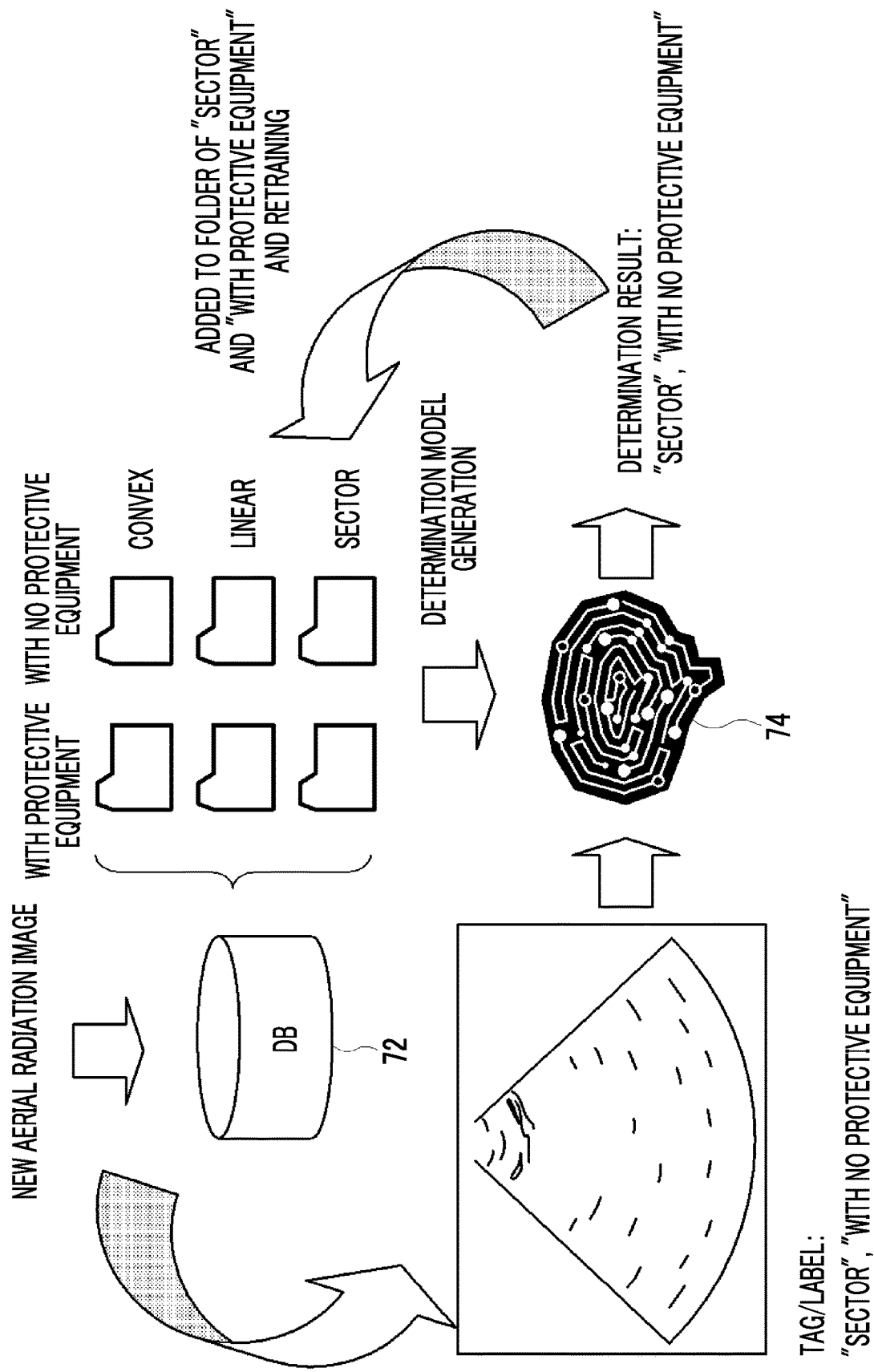
FIG. 15 is a conceptual diagram of an example illustrating a flow of a method of training a determination model.

As illustrated in FIG. 15, for example, new aerial radiation images acquired by the aerial radiation image acquisition unit 62 are sequentially transmitted by the terminal-side communication circuit 32 from the information terminal 3 to the server 5, and are sequentially stored in the database (DB) 72 of the server 5.

In the database 72, the aerial radiation images are distinguished and stored in different folders for each type of the ultrasound probe 1 and for each case of the presence and absence of protective equipment, on the basis of the tag and label assigned to the aerial radiation image.

The tag and label are not particularly limited, but can be read from setting conditions entered by the user at the start of the diagnosis, and assigned to the aerial radiation image before the aerial radiation image is stored in the database 72. Alternatively, the tag and label may be assigned to the aerial radiation image for each type of the ultrasound probe 1 and for each case of the presence and absence of protective equipment, on the basis of the shape of the image region of the aerial radiation image, the brightness in the aerial radiation image, character information described in the aerial radiation image, and the like.

The setting conditions and the character information described in the aerial radiation image may include information on the type of the ultrasound probe 1 to be used.

As illustrated in FIG. 16, the shape of the image region of the aerial radiation image differs depending on the type of the ultrasound probe 1, such as a convex type, a sector type, and a linear type. Accordingly, it is possible to determine the type of the ultrasound probe 1 from the shape of the image region of the aerial radiation image.

Further, the brightness in the aerial radiation image differs depending on the presence or absence of the gel, the presence or absence of the protective equipment, the presence or absence of the contact, and the like as illustrated in FIGS. 6 to 10. Accordingly, it is possible to determine the presence or absence of the protective equipment from the brightness in the aerial radiation image.

For example, the tag and label may be assigned to the aerial radiation image using a technique such as machine learning using feature amount vectors such as binarization, brightness value analysis, texture analysis, template matching, support vector machines (SVM), and Adaptive Boosting (Adaboost), neural networks, or deep learning.

A determination model in which the relationship between the aerial radiation image and the presence or absence of the protective equipment for each type of the ultrasound probe 1 is trained for a plurality of pieces of teacher data is created by the determination model learning unit 73 by using the aerial radiation images that are distinguished and stored in different folders of the database 72 for each type of the ultrasound probe 1 and for each case of the presence and absence of protective equipment, as the teacher data. In this manner, the determination model can use the new aerial radiation image acquired by the aerial radiation image acquisition unit 62 as an input, and output a prediction result of the presence or absence of the protective equipment for each type of the ultrasound probe 1, on the basis of the training result. In other words, it is possible to determine whether or not the protective equipment is attached to the ultrasound probe 1 according to the type of the ultrasound probe 1 in use, on the basis of the new aerial radiation image acquired by the aerial radiation image acquisition unit 62.

The aerial radiation images may be distinguished and stored in different folders of the database 72 for each type of the ultrasound probe 1, for each case of the presence and absence of protective equipment, and for each case of the presence and absence of gel.

In this case, a determination model in which the relationship with the aerial radiation image and the presence or absence of the protective equipment and the presence or absence of the gel for each type of the ultrasound probe 1 is trained for a plurality of pieces of teacher data is created by the determination model learning unit 73 by using the aerial radiation images that are distinguished and stored in different folders of the database for each type of the ultrasound probe 1, for each case of the presence and absence of protective equipment, and for each case of the presence and absence of gel, as the teacher data. Then, whether or not the protective equipment is attached to the ultrasound probe 1 and whether or not the gel is applied to the ultrasound probe 1 are determined according to the type of the ultrasound probe 1 in use by the determination model on the basis of the new aerial radiation image acquired by the aerial radiation image acquisition unit 62.

Similarly, the aerial radiation images may be distinguished and stored in different folders of the database for each type of the ultrasound probe 1, for each case of the presence and absence of protective equipment, for each case of the presence and absence of gel, and for each case of the presence and absence of the contact.

After the creation of the determination model is ended, in a case where the new aerial radiation image acquired by the aerial radiation image acquisition unit 62 is transmitted from the information terminal 3 to the server 5, determination as to whether or not the determination model is retrained including the new aerial radiation image is automatically performed.

For example, new aerial radiation images may be sequentially stored in the database 72, and the determination model 74 may be retrained by adding a predetermined number of aerial radiation images stored in the database 72 each time a predetermined number of aerial radiation images are stored in the database 72.

Alternatively, a similarity degree evaluation unit may be provided, a similarity degree between the new aerial radiation image and the existing aerial radiation image stored in the database 72 may be evaluated (calculated) b the similarity degree evaluation unit, and in a case where the similarity degree evaluated by the similarity degree evaluation unit is lower than a predetermined threshold value, that is, in a case where the new aerial radiation image is relatively significantly different from the existing aerial radiation image, the determination model 74 may be retrained by adding the new aerial radiation image.

The evaluation method (calculation method) of the similarity degree is not particularly limited, but can calculate the similarity degree between the aerial radiation images on the basis of a plurality of feature amounts of images, for example. The extraction method (calculation method) of the feature amount is not particularly limited, but at least one of the data amount of the image, the type of the main subject, the size of the main subject relative to the image, or the position of the main subject or a combination of a plurality of these feature amounts can be calculated, for example.

In a case where the determination result obtained for the new aerial radiation image by the determination model 74 is incorrect, the determination model may be retrained by adding the new aerial radiation image. As illustrated in FIG. 15, while the tag and label assigned to the aerial radiation image are "sector" and "with protective equipment", the determination result by the determination model 74 is "sector" and "with no protective equipment", and in a case where the determination result does not match the tag and label assigned to the aerial radiation image, the aerial radiation image is added to the folder of "sector" and "with protective equipment", and then the determination model 74 is retrained.

Figure 17:
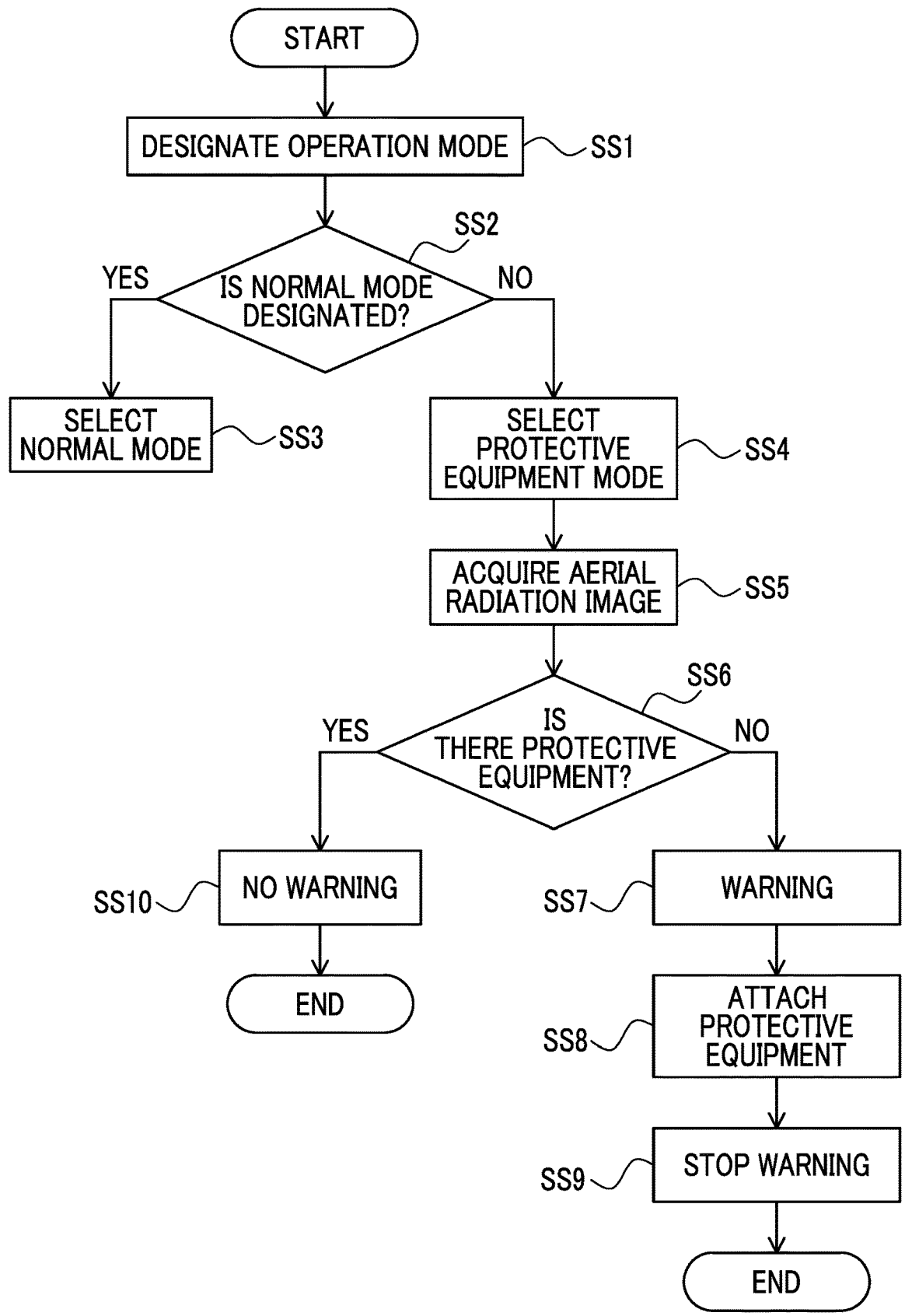
FIG. 17 is a flowchart of an example illustrating an operation of an ultrasound system in a case where protective equipment is monitored.

Next, the operation of the ultrasound system in a case of monitoring the protective equipment will be described with reference to the flowchart of FIG. 17.

The user turns on the ultrasound system, and inputs an instruction to designate the operation mode via the input device 37 (Step SS1).

In response, the mode selection unit 60 determines whether the instruction to designate the operation mode from the user is an instruction to designate the normal mode or an instruction to designate a protective equipment mode (Step SS2).

As a result, in a case where the instruction is an instruction to designate the normal mode (YES in Step SS2), the normal mode is selected by the mode selection unit 60 (Step SS3), and then the ultrasound image is captured as usual by the user.

On the other hand, in a case where the instruction is an instruction to designate the protective equipment mode (NO in Step SS2), the protective equipment mode is selected by the mode selection unit 60 (Step SS4), and then the processing proceeds to Step SS5.

In a case where the protective equipment mode is selected, the ultrasound image generated by the image generation unit in a state where the ultrasound probe 1 is separated from the body surface of the subject is acquired as the aerial radiation image by the aerial radiation image acquisition unit 62 (Step SS5).

More specifically, the aerial radiation image acquisition unit 62 acquires the ultrasound image generated by the image generation unit, and analyzes the acquired ultrasound image to determine whether the ultrasound image is an ultrasound image generated by the image generation unit in a state where the ultrasound probe 1 is separated from the body surface of the subject or an ultrasound image generated by the image generation unit in a state where the ultrasound probe 1 is in contact with the body surface of the subject. That is, it is determined whether or not the ultrasound probe 1 is in contact with the body surface of the subject.

As a result of the determination, in a case where the ultrasound image is an ultrasound image generated by the image generation unit in a state where the ultrasound probe 1 is separated from the body surface of the subject, that is, in a case where the ultrasound probe 1 is not in contact with the body surface of the subject, the ultrasound image is acquired as the aerial radiation image. Then, the processing proceeds to Step SS6.

On the other hand, in a case where the ultrasound image is an ultrasound image generated by the image generation unit in a state where the ultrasound probe 1 is in contact with the body surface of the subject, that is, in a case where the ultrasound probe 1 is in contact with the body surface of the subject, a warning such as "please detach probe" or "please check attachment of protective equipment" is issued to the user by the warning unit 66, for example.

In response, the user can check the presence or absence of the protective equipment, and in a case where the protective equipment is attached, the user can continue the diagnosis, for example. On the other hand, in a case where the protective equipment is not attached, for example, the user can perform a diagnosis by bringing the ultrasound probe 1 into contact with the body surface of the subject after separating the ultrasound probe 1 from the body surface of the subject and attaching the protective equipment to the ultrasound probe 1.

Subsequently, by analyzing the aerial radiation image acquired by the aerial radiation image acquisition unit 62, the presence or absence of the protective equipment is determined by the protective equipment attachment determination unit 64 (Step SS6). The protective equipment attachment determination unit 64 may determine the presence or absence of the gel and the presence or absence of the contact in addition to the presence or absence of the protective equipment.

As a result, in a case where it is determined that there is no protective equipment (NO in Step SS6), a warning is issued to the user by the warning unit 66 (Step SS7). Even after the warning is issued by the warning unit 66, the acquisition of the aerial radiation image by the aerial radiation image acquisition unit 62 and the determination on the presence or absence of the protective equipment by the protective equipment attachment determination unit 64 are continued. The warning unit 66 continues to issue the warning until it is determined that the protective equipment is attached to the ultrasound probe 1 by the protective equipment attachment determination unit 64.

In response, the user checks the presence or absence of the protective equipment, and, for example, attaches the protective equipment to the ultrasound probe 1 in a case where the protective equipment is not attached (Step SS8). In a case where the protective equipment is attached, it is determined that there is protective equipment by the protective equipment attachment determination unit 64, and the warning by the warning unit 66 is stopped (Step SS9). Thereafter, the ultrasound image is captured as usual by the user.

On the other hand, in a case where it is determined that there is protective equipment (YES in Step SS6), the warning by the warning unit 66 is not issued (Step SS10), and the ultrasound image is captured as usual by the user.

In the ultrasound system of the present embodiment, forgetting to attach the protective equipment is determined by analyzing the aerial radiation image to issue a warning to the user, and therefore, it is possible to prevent the user from forgetting to attach the protective equipment in a general ultrasound probe. Therefore, it is possible to reduce the risk of the occurrence of infectious diseases, and it is possible to save the trouble of cleaning the ultrasound probe after the diagnosis. Further, the ultrasound system of the present embodiment can be applied to a general ultrasound probe 1, and therefore, it is possible to suppress an increase in manufacturing cost and reduce the risk of failure.

Note that a mode return unit may be provided, and in a case where the protective equipment mode is selected by the mode selection unit 60 and it is determined that the protective equipment is attached to the ultrasound probe 1 by the protective equipment attachment determination unit 64 during the driving in a sleep mode, the protective equipment mode may be returned to the normal mode by the mode return unit.

The sleep mode is a power saving mode that acquires and displays the ultrasound image at low power, that is, at low frame rate and low power output, and for example, the driving is made in the sleep mode in a case where the ultrasound system has not been used for a certain period of time or the like.

By providing the mode return unit, the user can automatically return the mode from the protective equipment mode to the normal mode in a case where the protective equipment is attached to the ultrasound probe 1 during the driving in the sleep mode.

The protective equipment attachment determination unit 64 may separately include a determination unit that determines the presence or absence of the protective equipment and a determination unit that determines the presence or absence of the contact, and may execute the determination on the presence or absence of the protective equipment and the determination on the presence or absence of the contact in parallel. Further, the protective equipment attachment determination unit 64 may include one determination unit that determines the presence or absence of the protective equipment and the presence or absence of the contact, and sequentially execute the determination on the presence or absence of the protective equipment and the determination on the presence or absence of the contact.

Next, a specific example of the warning to be issued to the user will be described.

In the case of a state with no gel and no protective equipment illustrated in FIG. 6, the warning unit 66 issues a warning, for example, "please apply gel".

In response, in a case where the user applies the gel to the ultrasound probe 1, a state with gel and no protective equipment illustrated in FIG. 7 is obtained.

In this case, the warning unit 66 issues a warning, for example, "please attach protective equipment".

In response, in a case where the user attaches the protective equipment to the ultrasound probe 1, a state with gel and protective equipment illustrated in FIG. 8 is obtained.

In this case, the warning unit 66 issues a message, for example, "please bring the ultrasound probe into contact with the body surface".

In response, in a case where the user brings the ultrasound probe 1 into contact with the body surface of the subject, a state with the gel, the protective equipment, the contact of the ultrasound probe 1 with the body surface of the subject illustrated in FIG. 9 is obtained.

Alternatively, in the case of a state with no gel and no protective equipment illustrated in FIG. 6, the warning unit 66 issues a warning, for example, "please apply gel and attach protective equipment".

In response, in a case where the user applies gel and attaches the protective equipment to the ultrasound probe 1, a state with gel and protective equipment illustrated in FIG. 8 is obtained.

In this case, the warning unit 66 issues a message, for example, "please bring the ultrasound probe into contact with the body surface".

In response, in a case where the user brings the ultrasound probe 1 into contact with the body surface of the subject, a state with the gel, the protective equipment, the contact of the ultrasound probe 1 with the body surface of the subject illustrated in FIG. 9 is obtained.

Similarly, in the case of a state with no gel and no protective equipment illustrated in FIG. 6, the warning unit 66 issues a warning, for example, "please apply gel and attach protective equipment".

On the other hand, in a case where the user applies gel to the ultrasound probe 1 but does not attach the protective equipment to the ultrasound probe 1, a state with gel and no protective equipment illustrated in FIG. 7 is obtained.

In this case, the warning unit 66 issues a warning, for example, "protective equipment is not attached".

In response, in a case where the user attaches the protective equipment to the ultrasound probe 1, a state with gel and protective equipment illustrated in FIG. 8 is obtained.

In this case, the warning unit 66 issues a message, for example, "please bring the ultrasound probe into contact with the body surface".

In response, in a case where the user brings the ultrasound probe 1 into contact with the body surface of the subject, a state with the gel, the protective equipment, the contact of the ultrasound probe 1 with the body surface of the subject illustrated in FIG. 9 is obtained.

Alternatively, in a case where the ultrasound probe 1 is in contact with the body surface of the subject illustrated in FIG. 10, the warning unit 66 issues a warning "please detach probe" or "please check attachment of protective equipment", for example.

In response, in a case where the user detaches the ultrasound probe 1 from the body surface of the subject, a state with gel and no protective equipment illustrated in FIG. 7 is obtained.

In this case, the warning unit 66 issues a warning, for example, "protective equipment is not attached".

In response, by the user attaching the protective equipment to the ultrasound probe 1, a state with gel and protective equipment illustrated in FIG. 8 is obtained.

Alternatively, in a case where the ultrasound probe 1 is in contact with the body surface of the subject illustrated in FIG. 10, the warning unit 66 issues a warning "please detach probe" or "please check attachment of protective equipment", for example.

In response, in a case where the user detaches the ultrasound probe 1 from the body surface of the subject and attaches the protective equipment to the ultrasound probe 1, a state with gel and protective equipment illustrated in FIG. 8 is obtained.

In this case, the warning unit 66 issues a message, for example, "please bring the ultrasound probe into contact with the body surface".

In response, in a case where the user brings the ultrasound probe 1 into contact with the body surface of the subject, a state with the gel, the protective equipment, the contact of the ultrasound probe 1 with the body surface of the subject illustrated in FIG. 9 is obtained.

The specific examples of the warning to be issued to the user have been described, but the present invention is not limited thereto, and any warning may be issued to the user.

Figure 18:
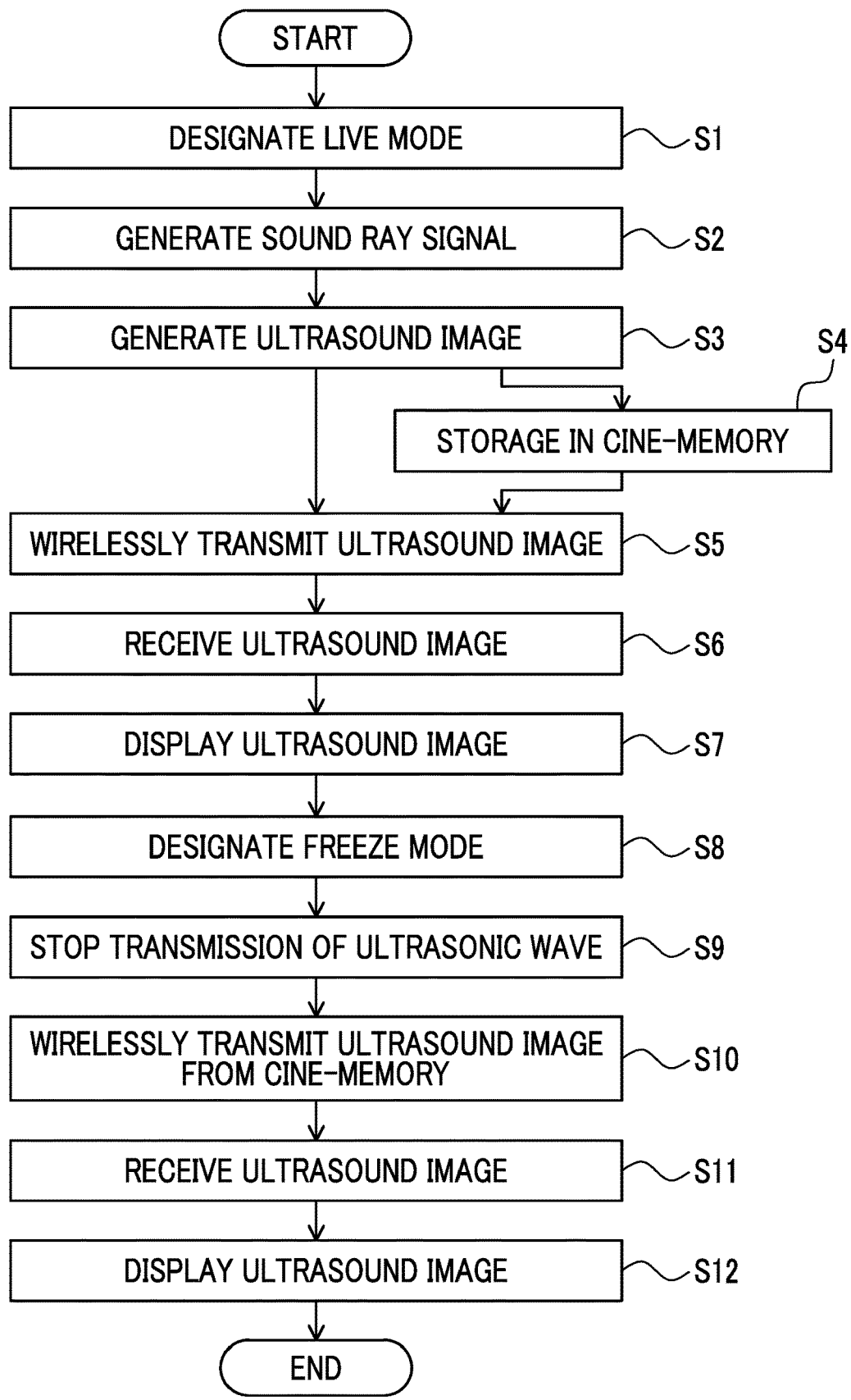
FIG. 18 is a flowchart of an example illustrating an operation of an ultrasound system in a case where an ultrasound image is captured.

Next, the operation of the ultrasound system in a case where the ultrasound image is captured will be described with reference to the flowchart of FIG. 18. First, the operation of the ultrasound system in the case of the live mode will be described.

In a case where the live mode is designated on the basis of the user's instruction input from the input device 37 (Step S1), in a state where the ultrasound probe 1 is in contact with the body surface of the subject, the transmission of the ultrasonic waves is started by the transmission and reception circuit 14, and the sound ray signal is generated (Step S2).

That is, under the control of the probe control unit 21, ultrasound beams are transmitted into the subject from the plurality of transducers of the transducer array 11 according to the drive signal from the pulser 51 of the transmission and reception circuit 14.

Ultrasound echoes from the subject based on the ultrasound beams transmitted from the pulser 51 are received by each transducer of the transducer array 11, and the reception signal as an analog signal is output from each transducer of the transducer array 11, which has received the ultrasound echo.

The reception signal as the analog signal output from each transducer of the transducer array 11 is amplified by the amplification unit 52 of the transmission and reception circuit 14, and is subjected to AD conversion by the AD conversion unit 53, and thereby the reception data is acquired.

By performing the reception focusing processing on the reception data by the beam former 54, the sound ray signal is generated.

Next, the ultrasound image is generated as the image information data by the image information data generation unit 19 on the basis of the sound ray signal generated by the beam former 54 of the transmission and reception circuit 14 (Step S3).

That is, the sound ray signal generated by the beam former 54 is subjected to various kinds of signal processing by the signal processing unit 16 of the image information data generation unit 19, and the signal representing tomographic image information regarding tissues inside the subject is generated as the image signal data before imaging.

The image signal data generated by the signal processing unit 16 is raster-converted by the image processing unit 17, and is further subjected to various kinds of image processing, and the ultrasound image is generated as the image information data.

The ultrasound image generated by the image processing unit 17 is stored in the cine-memory 22 (Step S4).

Further, the ultrasound image generated by the image processing unit 17 is wirelessly transmitted from the probe-side communication circuit 18 to the information terminal 3 (Step S5).

Next, the ultrasound image wirelessly transmitted from the probe-side communication circuit 18 of the ultrasound probe 1 is received by the terminal-side communication circuit 32 under the control of the terminal control unit 36 of the information terminal 3 (Step S6).

Next, the display control unit 33 performs predetermined processing on the ultrasound image received by the terminal-side communication circuit 32 to display the processed ultrasound image on the monitor 34 (Step S7).

That is, in the case of the live mode, as the image information data, the ultrasound image generated by the image processing unit 17 of the image information data generation unit 19 of the ultrasound probe 1 is wirelessly transmitted from the probe-side communication circuit 18. On the other hand, the display control unit 33 of the information terminal 3 displays the ultrasound image received by the terminal-side communication circuit 32 on the monitor 34.

Next, the operation of the ultrasound system in the case of the freeze mode will be described.

In a case where the freeze mode is designated on the basis of the user's instruction input from the input device 37 (Step S8), the transmission of the ultrasonic waves from the transducer array 11 is stopped (Step S9).

In this case, as the image information data, the ultrasound images of the past frames stored in the cine-memory 22 are read out and wirelessly transmitted from the probe-side communication circuit 18 (Step S10).

Next, the ultrasound image wirelessly transmitted from the probe-side communication circuit 18 is received by the terminal-side communication circuit 32 (Step S11).

Next, the display control unit 33 displays the ultrasound image of the past frame received by the terminal-side communication circuit 32 on the monitor 34 (Step S12).

The present invention is not limited to the handheld ultrasound system, and can be similarly applied to a stationary ultrasound system, or a portable ultrasound system of which the information terminal is realized by a laptop terminal device.

Further, the present invention can be applied to a case of diagnosing pressure ulcers, edema that is a kind of phlebitis, and the like.

In the device of the present invention, the hardware configurations of the processing units executing various kinds of processing such as the transmission and reception circuit 14, the signal processing unit 16, the image processing unit 17, the probe control unit 21, the display control unit 33, the protective equipment monitoring unit 35, and the terminal control unit 36 may be dedicated hardware, or may be various processors or computers that execute programs.

The hardware configurations of the cine-memory 22 and the like may be dedicated hardware, or may be a memory such as a semiconductor memory and a storage device such as a hard disk drive (HDD) and a solid state drive (SSD).

The various processors include a central processing unit (CPU) as a general-purpose processor executing software (program) and functioning as various processing units, a programmable logic device (PLD) as a processor of which the circuit configuration can be changed after manufacturing such as a field programmable gate array (FPGA), and a dedicated electric circuit as a processor having a circuit configuration designed exclusively for executing a specific process such as an application specific integrated circuit (ASIC).

One processing unit may be configured by one of the various processors or may be configured by a combination of the same or different kinds of two or more processors, for example, a combination of a plurality of FPGAs or a combination of an FPGA and a CPU). Further, a plurality of processing units may be configured by one of various processors, or two or more of a plurality of processing units may be collectively configured by using one processor.

For example, there is a form where one processor is configured by a combination of one or more CPUs and software as typified by a computer, such as a server and a client, and this processor functions as a plurality of processing units. Further, there is a form where a processor fulfilling the functions of the entire system including a plurality of processing units by one integrated circuit (IC) chip as typified by a system on chip (SoC) or the like is used.

Furthermore, the hardware configurations of these various processors are more specifically electric circuitry where circuit elements, such as semiconductor elements, are combined.

The method of the present invention can be carried out, for example, by a program for causing a computer to execute each step of the method. Further, a computer-readable recording medium in which this program is recorded can also be provided.

The present invention has been described in detail, but the present invention is not limited to the above-described embodiments, and various improvements and changes may be made within a range not departing from the scope of the present invention.

EXPLANATION OF REFERENCES

1: ultrasound probe
3: information terminal
5: server
7: communication line
11: transducer array
14: transmission and reception circuit
16: signal processing unit
17: image processing unit
18: probe-side communication circuit
19: image information data generation unit
21: probe control unit
22: cine-memory
24: battery
25: probe-side processor
32: terminal-side communication circuit
33: display control unit
34: monitor
35: protective equipment monitoring unit
36: terminal control unit
37: input device 39: terminal-side processor
51: pulser
52: amplification unit
53: AD conversion unit
54: beam former
60: mode selection unit
62: aerial radiation image acquisition unit
64: protective equipment attachment determination unit
66: warning unit
71: server-side communication circuit
72: database
73: determination model learning unit
74: determination model
75: server control unit
80: storage unit
81: comparison unit
82: update unit
83: determination model
84: transmission and reception unit

What is claimed is:

1. An ultrasound system comprising:
an ultrasound probe; and
a processor, wherein the processor is configured to:
  generate an ultrasound image from a reception signal obtained by performing transmission and reception of an ultrasound beam with respect to a subject using the ultrasound probe;
  perform a comparison of an image pattern of the ultrasound image to an image pattern of a representative aerial radiation image for which a representative ultrasound probe is separated from a representative body surface of a representative subject and for which a representative protective equipment is not attached to a representative ultrasonic wave transmission and reception surface of the representative ultrasound probe;
  determine that protective equipment is not attached to an ultrasonic wave transmission and reception surface of the ultrasound probe based on a pattern recognition result of the comparison indicating the image pattern of the ultrasound image matches the image pattern of the representative aerial radiation image; and
  cause a monitor to display a warning in response to determining that the protective equipment is not attached to the ultrasonic wave transmission and reception surface of the ultrasound probe.

2. The ultrasound system according to claim 1,
wherein the processor is configured to perform a second comparison of the ultrasound image with a second representative aerial radiation image for which a second representative ultrasound probe is separated from a second representative body surface of a second representative subject and for which second representative protective equipment is attached to a second representative ultrasonic wave transmission and reception surface of the second representative ultrasound probe and determine that the protective equipment is attached to the ultrasonic wave transmission and reception surface of the ultrasound probe based on a second result of the second comparison.

3. The ultrasound system according to claim 1,
wherein the processor is configured to:
  update a database of representative aerial radiation images with at least one of a latest representative aerial radiation image with protective equipment acquired using the ultrasound probe to which the protective equipment is attached and a latest representative aerial radiation image with no protective equipment acquired using the ultrasound probe to which the protective equipment is not attached, by adding the latest representative aerial radiation image with protective equipment and the latest representative aerial radiation image with no protective equipment, and
  determine whether the protective equipment is attached to the ultrasound probe by comparing the ultrasound image with the latest representative aerial radiation image with protective equipment and the latest representative aerial radiation image with no protective equipment.

4. The ultrasound system according to claim 1,
wherein the processor is configured to:
  acquire the ultrasound image generated by the processor,
  determine whether the ultrasound probe is in contact with a body surface of the subject by analyzing the acquired ultrasound image, and
  output a warning in a case that the processor determines that the ultrasound probe is in contact with the body surface of the subject.

5. The ultrasound system according to claim 1,
wherein the processor is configured to:
  acquire a video as the ultrasound image, and
  determine that the protective equipment is attached to the ultrasound probe that has been determined not to be attached with the protective equipment, by a change of an image pattern in the video.

6. The ultrasound system according to claim 1, wherein the image pattern of the representative aerial radiation image includes a high brightness portion only within a certain range from an upper portion of the representative aerial radiation image and a low brightness portion over a remainder of the representative aerial radiation image.

7. The ultrasound system according to claim 1, wherein the image pattern of the representative aerial radiation image includes a shape of an image region the representative aerial radiation image, and the shape of the image region includes one of a convex type, a sector type, and a linear type.

8. The ultrasound system according to claim 1,
wherein the processor is configured to execute a determination model that is trained using an aerial radiation image with protective equipment acquired using the ultrasound probe to which the protective equipment is attached and an aerial radiation image with no protective equipment acquired using the ultrasound probe to which the protective equipment is not attached, as teacher data, and
the processor is configured to determine whether the protective equipment is attached to the ultrasound probe by the determination model on the basis of a new aerial radiation image acquired by the processor.

9. The ultrasound system according to claim 8, further comprising:
a database in which the aerial radiation images are distinguished and sequentially stored for each type of the ultrasound probe and for each case of presence and absence of the protective equipment.

10. The ultrasound system according to claim 9,
wherein the determination model is trained using the aerial radiation images distinguished and stored in the database for each type of the ultrasound probe, for each case of the presence and absence of the protective equipment, and for each case of presence and absence of gel, as the teacher data, and determines whether or not the protective equipment is attached to the ultrasound probe and whether the gel is applied to the ultrasound probe according to the type of the ultrasound probe in use on the basis of the new aerial radiation image acquired by the processor.

11. The ultrasound system according to claim 9, wherein the determination model is trained using the aerial radiation images distinguished and stored in the database for each type of the ultrasound probe and for each case of the presence and absence of the protective equipment, as the teacher data, and determines whether the protective equipment is attached to the ultrasound probe according to the type of the ultrasound probe in use on the basis of the new aerial radiation image acquired by the processor.

12. The ultrasound system according to claim 11, wherein the determination model is retrained by adding a predetermined number of the aerial radiation images stored in the database each time the predetermined number of the aerial radiation images are stored in the database.

13. The ultrasound system according to claim 11, wherein the processor is configured to evaluate a similarity degree between the new aerial radiation image and an existing aerial radiation image stored in the database, and
the determination model is retrained by adding the new aerial radiation image in a case that the similarity degree evaluated by the processor is lower than a predetermined threshold value.

14. The ultrasound system according to claim 11, wherein the determination model is retrained by adding the new aerial radiation image in a case where a determination result obtained by the determination model for the new aerial radiation image is incorrect.

15. The ultrasound system according to claim 11, wherein the determination model is retrained by adding a predetermined number of the aerial radiation images stored in the database each time the predetermined number of the aerial radiation images are stored in the database.

16. The ultrasound system according to claim 1, further comprising:
a server that has a determination model that is trained using an aerial radiation image with protective equipment acquired using the ultrasound probe to which the protective equipment is attached and an aerial radiation image with no protective equipment acquired using the ultrasound probe to which the protective equipment is not attached, as teacher data,
wherein the processor is configured to:
transmit a new aerial radiation image acquired by the processor to the server, and
receive, from the server, a determination result of the determination model determining whether the protective equipment is attached to the ultrasound probe on the basis of the new aerial radiation image received in the server.

17. The ultrasound system according to claim 16, further comprising:
a database in which the aerial radiation images are distinguished and sequentially stored for each type of the ultrasound probe and for each case of presence and absence of the protective equipment.

18. The ultrasound system according to claim 17, wherein the determination model is trained using the aerial radiation images distinguished and stored in the database for each type of the ultrasound probe and for each case of the presence and absence of the protective equipment, as the teacher data, and determines whether the protective equipment is attached to the ultrasound probe according to the type of the ultrasound probe in use on the basis of the new aerial radiation image acquired by the processor.

19. The ultrasound system according to claim 17, wherein the determination model is trained using the aerial radiation images distinguished and stored in the database for each type of the ultrasound probe, for each case of the presence and absence of the protective equipment, and for each case of presence and absence of gel, as the teacher data, and determines whether the protective equipment is attached to the ultrasound probe and whether or not the gel is applied to the ultrasound probe according to the type of the ultrasound probe in use on the basis of the new aerial radiation image acquired by the processor.

20. The ultrasound system according to claim 1, wherein:
the processor is configured to select any one of a normal mode or a protective equipment mode, and
in a case where the protective equipment mode is selected by the processor, the processor is configured to determine whether the protective equipment is attached to the ultrasound probe.

21. The ultrasound system according to claim 20, wherein:
the processor is configured to return from the protective equipment mode to the normal mode in a case that the processor determines that the protective equipment is attached to the ultrasound probe during driving in a sleep mode.

22. A control method of an ultrasound system, the control method comprising:
generating an ultrasound image from a reception signal obtained by performing transmission and reception of an ultrasound beam with respect to a subject using an ultrasound probe;
performing a comparison of an image pattern of the ultrasound image to an image pattern of a representative aerial radiation image for which a representative ultrasound probe is separated from a representative body surface of a representative subject and for which a representative protective equipment is not attached to a representative ultrasonic wave transmission and reception surface of the representative ultrasound probe;
determining that protective equipment is not attached to an ultrasonic wave transmission and reception surface of the ultrasound probe based on a result of the comparison indicating the image pattern of the ultrasound image matches the image pattern of the representative aerial radiation image; and
causing a monitor to display a warning in response to determining that the protective equipment is not attached to the ultrasonic wave transmission and reception surface of the ultrasound probe.

* * * * *